United States Patent [19]
Sato

[11] Patent Number: 5,563,739
[45] Date of Patent: Oct. 8, 1996

[54] STANDARD ZOOM LENS

[75] Inventor: Haruo Sato, Kawasaki, Japan

[73] Assignee: Nikon Corporation, Tokyo, Japan

[21] Appl. No.: 389,180

[22] Filed: Feb. 15, 1995

[30] Foreign Application Priority Data

Feb. 18, 1994 [JP] Japan .................................. 6-044826

[51] Int. Cl.$^6$ .................................................. G02B 15/14
[52] U.S. Cl. ........................................... 359/691; 359/715
[58] Field of Search .................................. 359/691, 686, 359/715

[56] References Cited

U.S. PATENT DOCUMENTS 5,076,677  12/1991  Sato ............................................ 359/691

FOREIGN PATENT DOCUMENTS

| 52-135750 | 11/1977 | Japan . |
| 4-251211 | 9/1992 | Japan . |
| 5-249376 | 9/1993 | Japan . |

Primary Examiner—Georgia Y. Epps
Assistant Examiner—Evelyn A. Lester
Attorney, Agent, or Firm—Shapiro and Shapiro

[57] ABSTRACT

A zoom lens has a first lens unit having a negative refractive power as a whole, and a second lens unit having a positive refractive power as a whole, and effects zooming by changing the air gap between the first and second lens units. The first lens unit has a first negative meniscus lens with a concave surface having a more intense curvature and facing the image side, a second negative meniscus lens with a concave surface having a more intense curvature and facing the image side, and a positive lens with a convex surface facing the object side. The second lens unit has a positive lens component having at least two positive lenses, a negative lens component, and a positive lens component. At least one of the lens surfaces constituting the first lens unit is an aspherical surface. The zoom lens satisfies the following conditions:

$$0.6 < |f1|/(fw \cdot ft)^{1/2} < 1.0$$

$$0.13 < d45/d2 < 0.5.$$

9 Claims, 24 Drawing Sheets

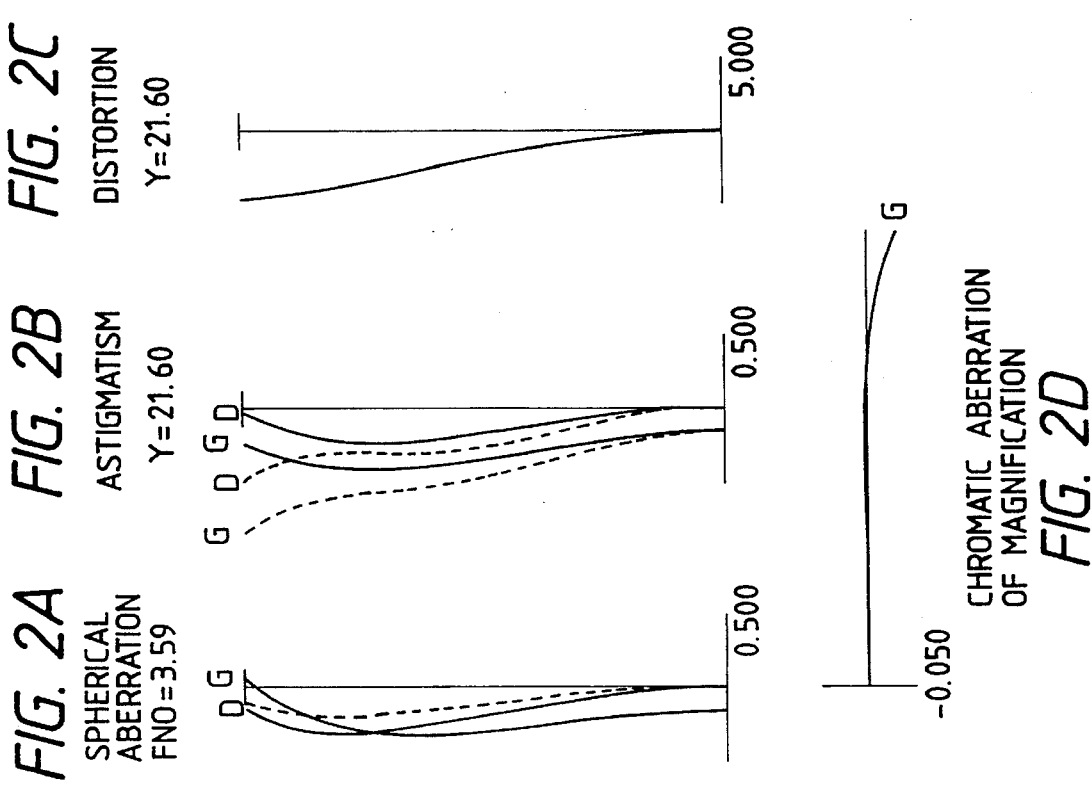

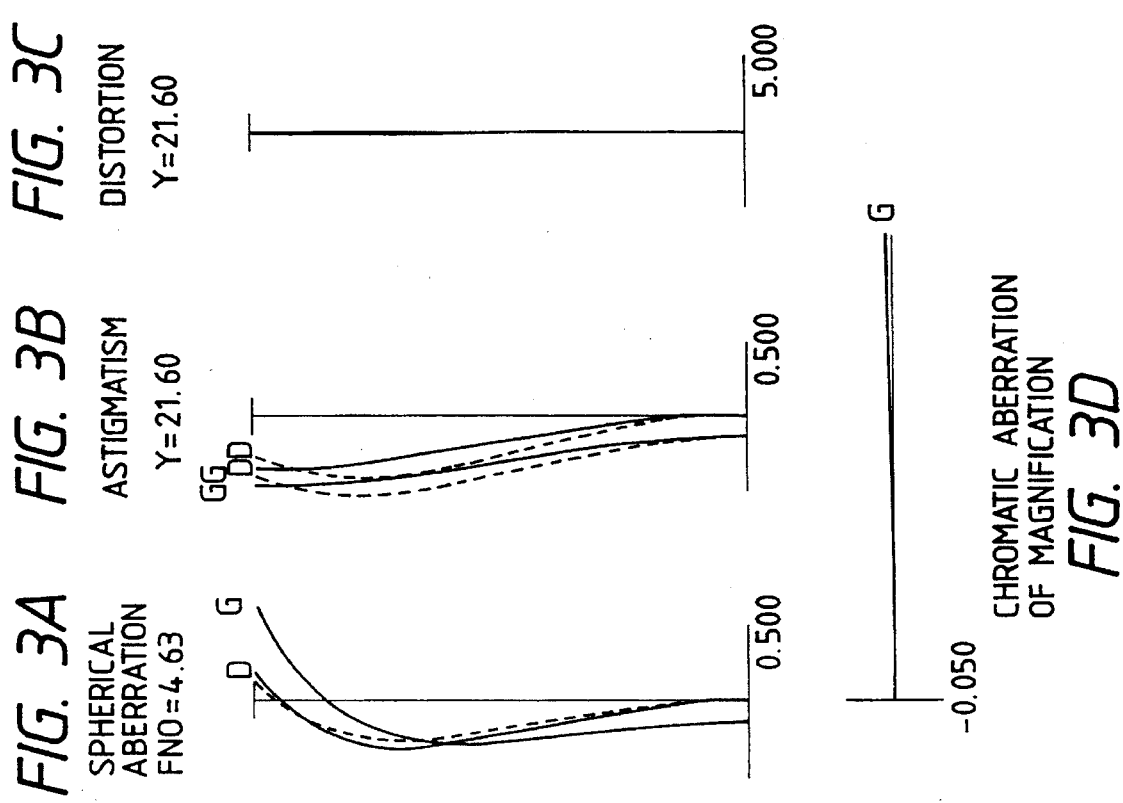

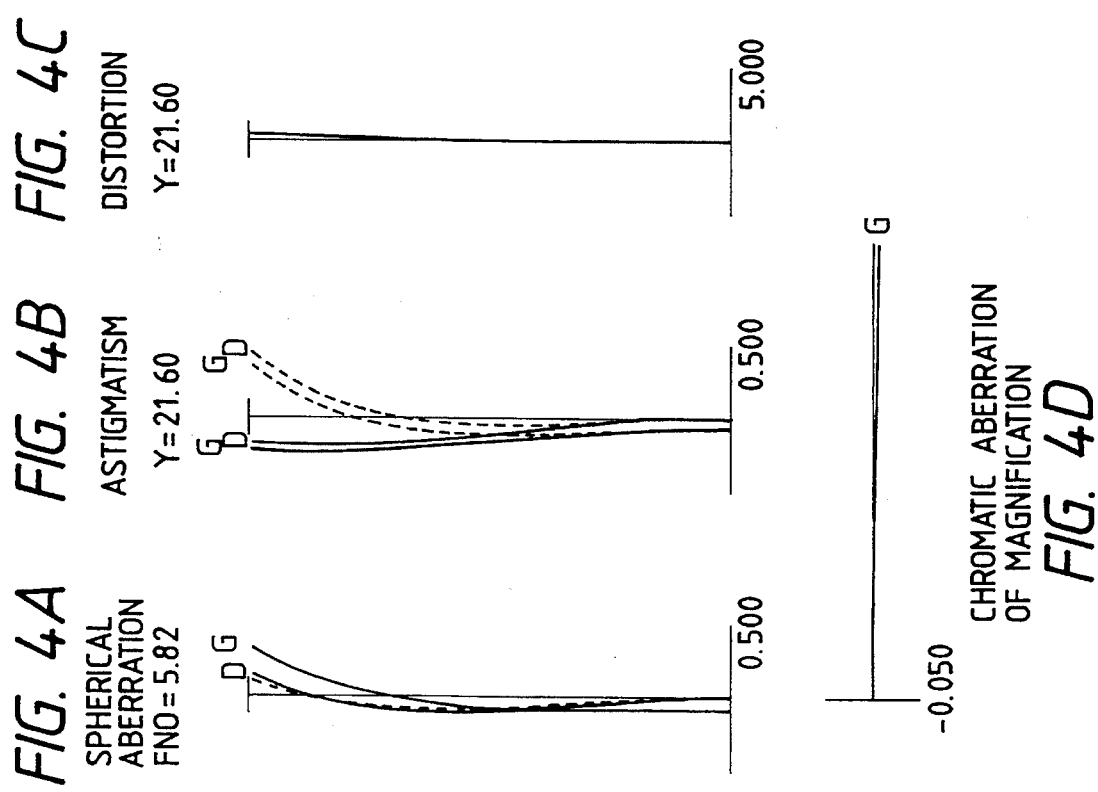

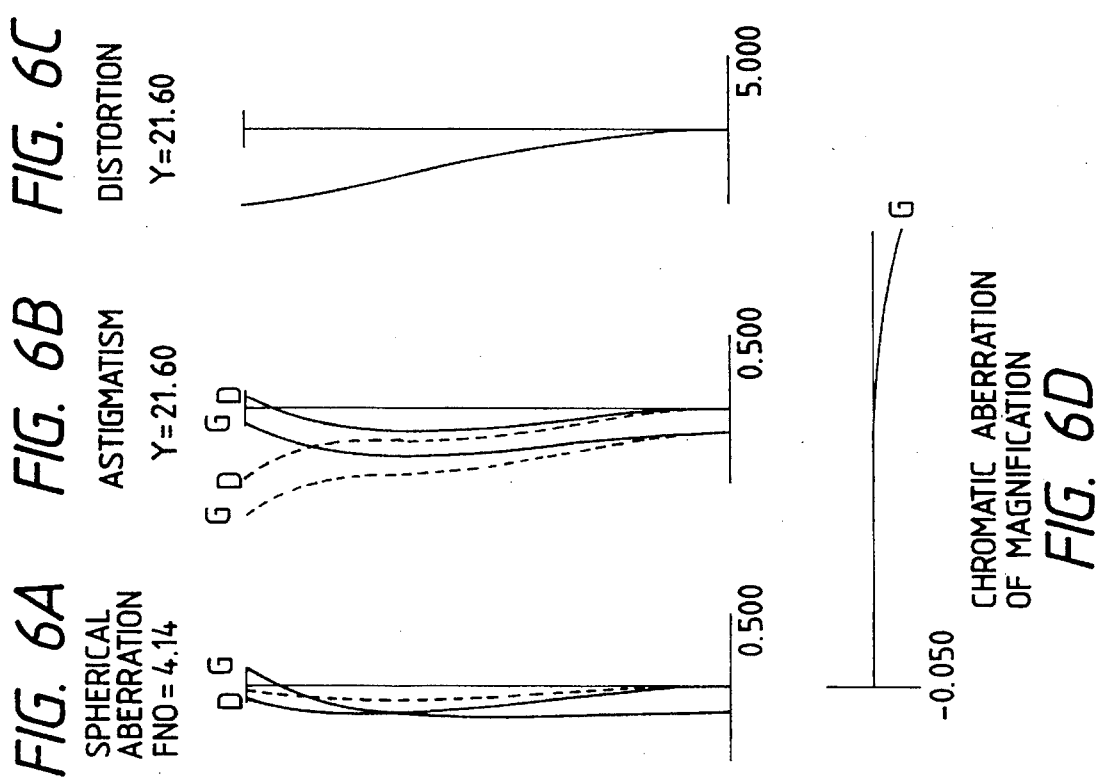

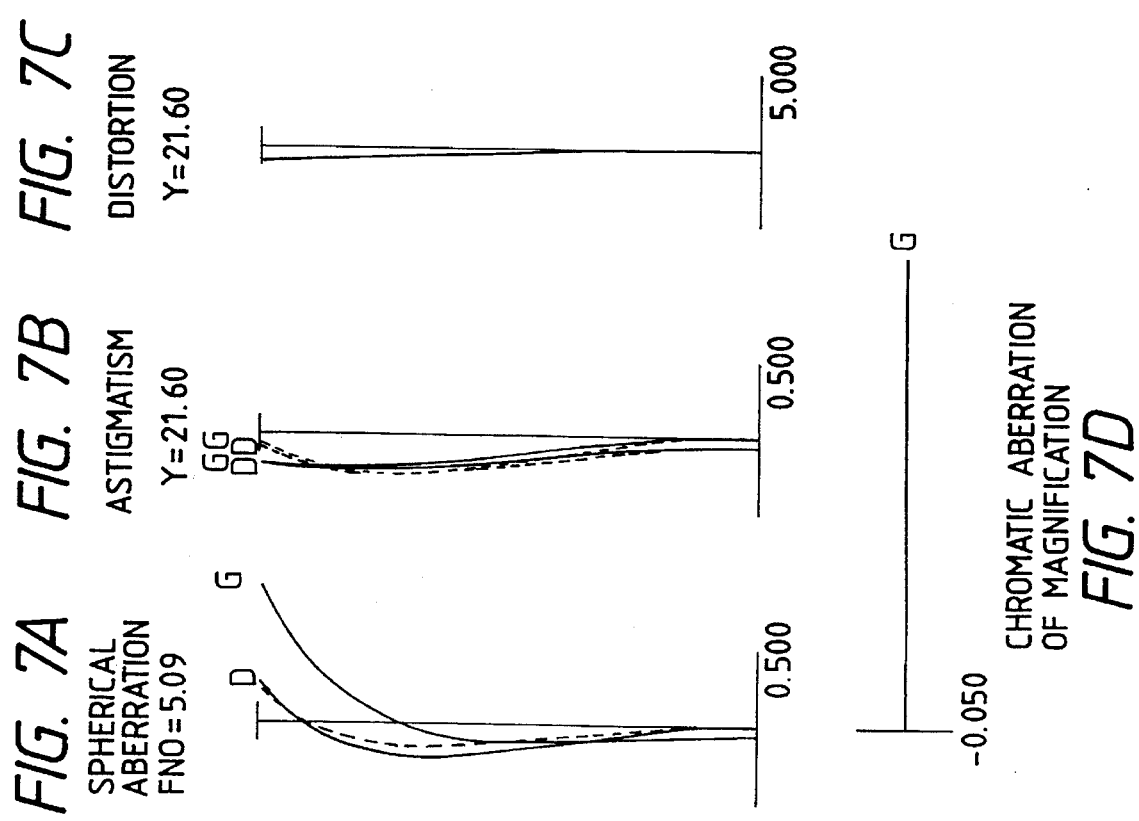

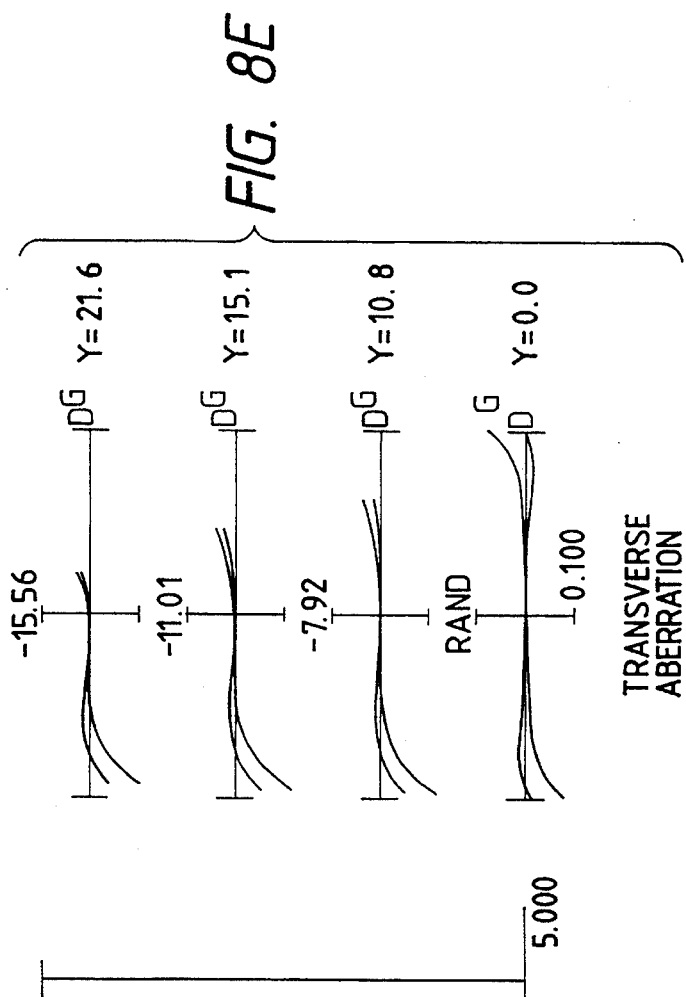
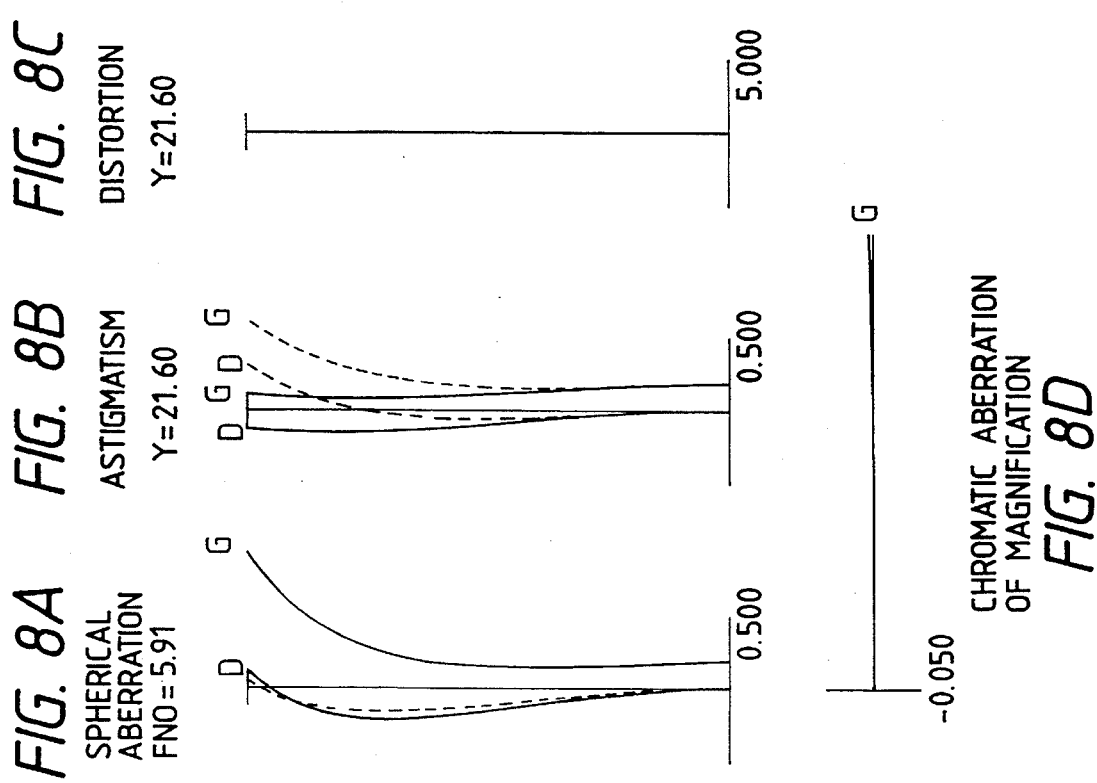

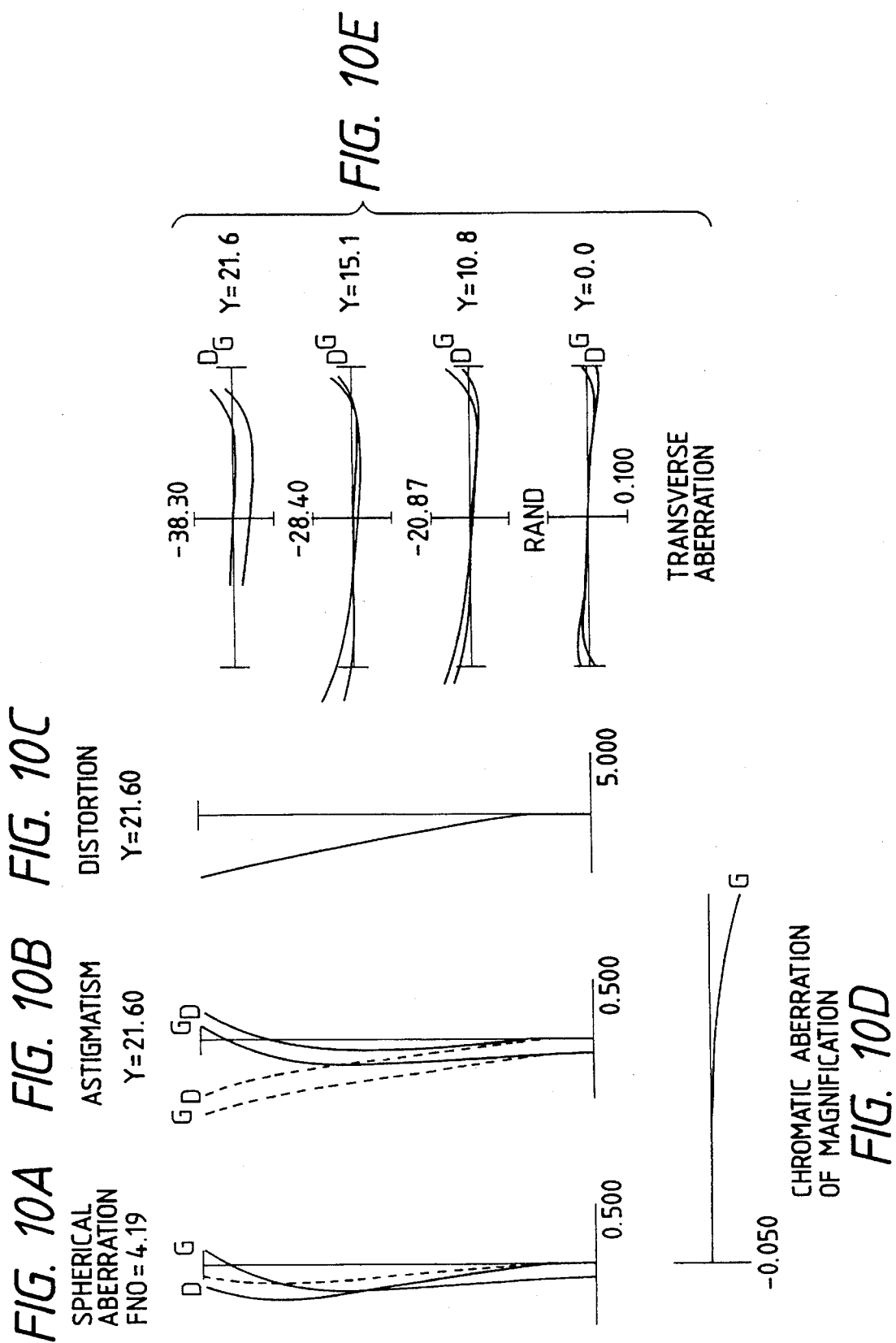

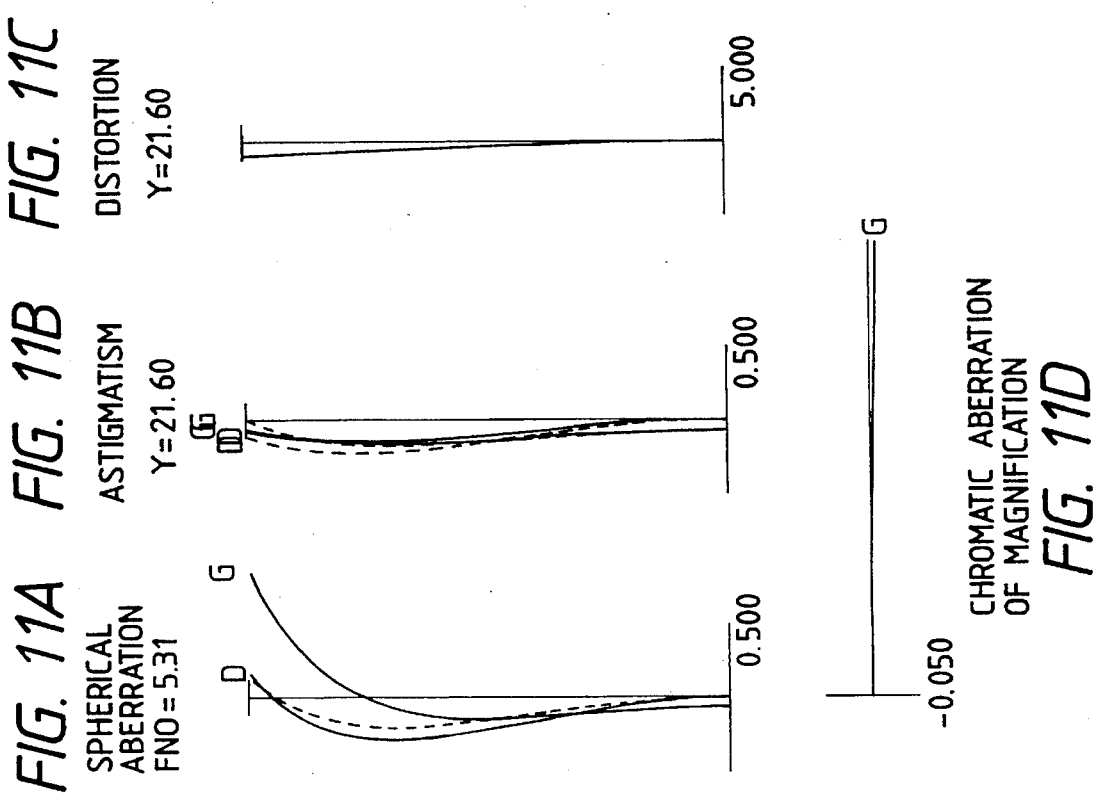

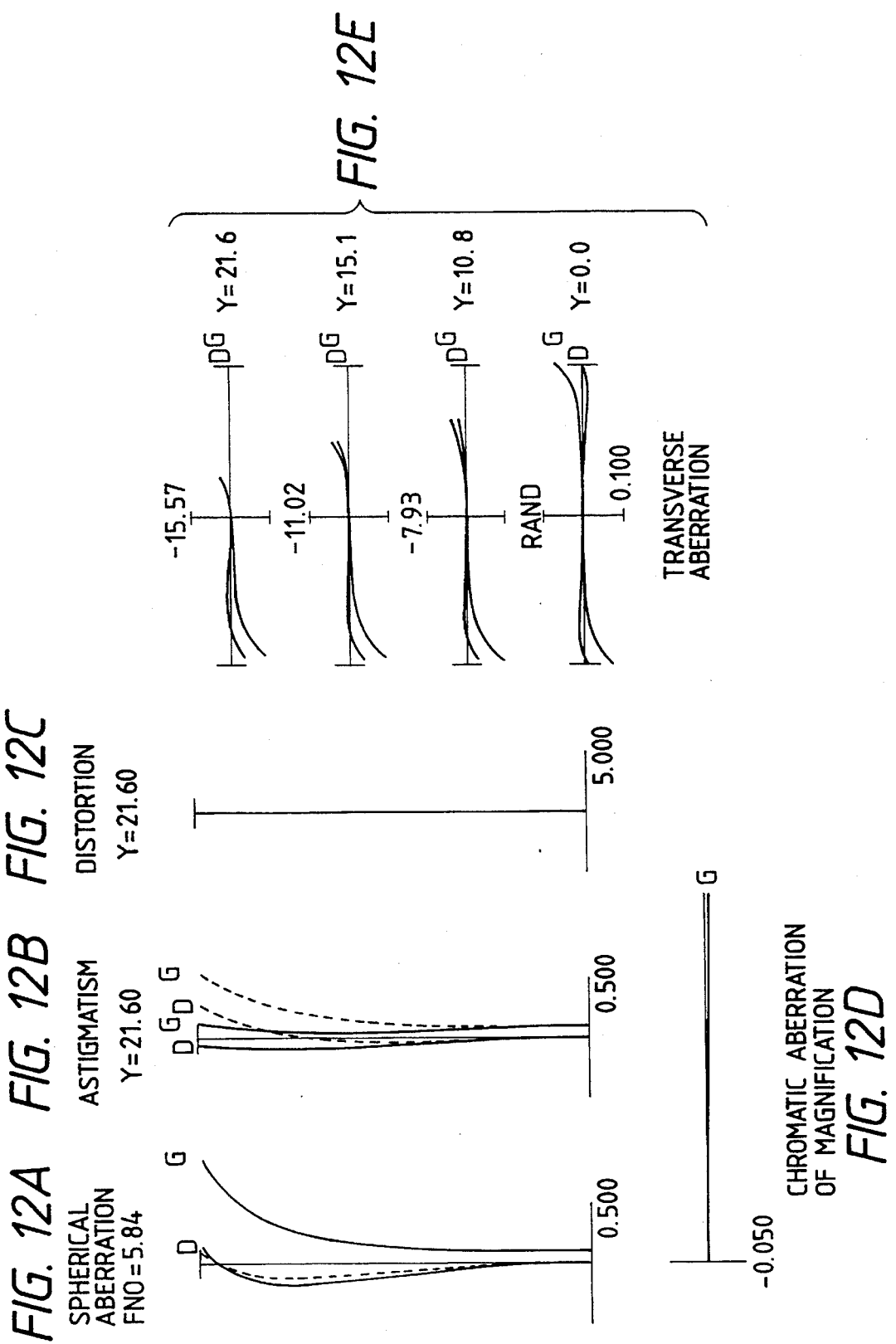

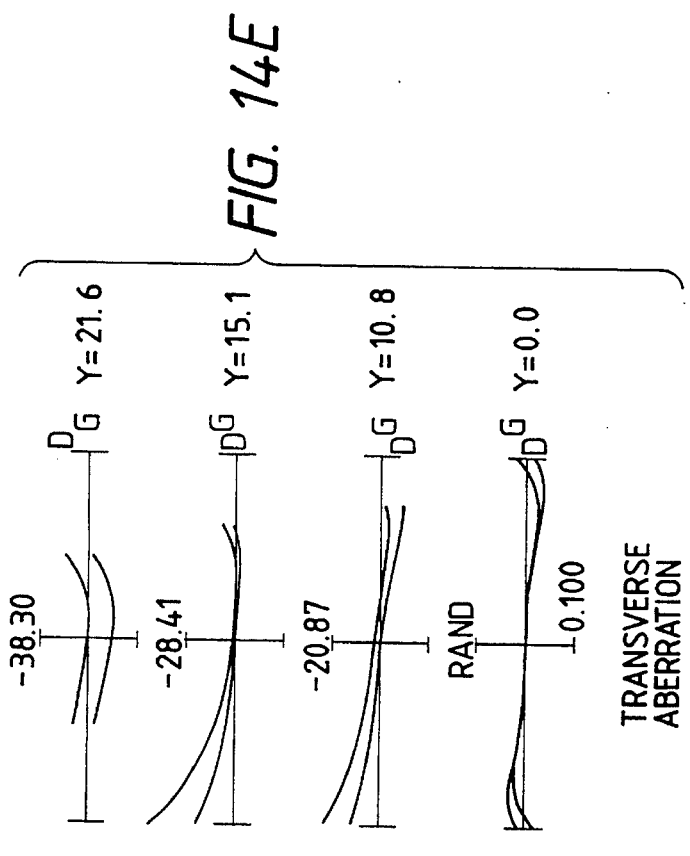
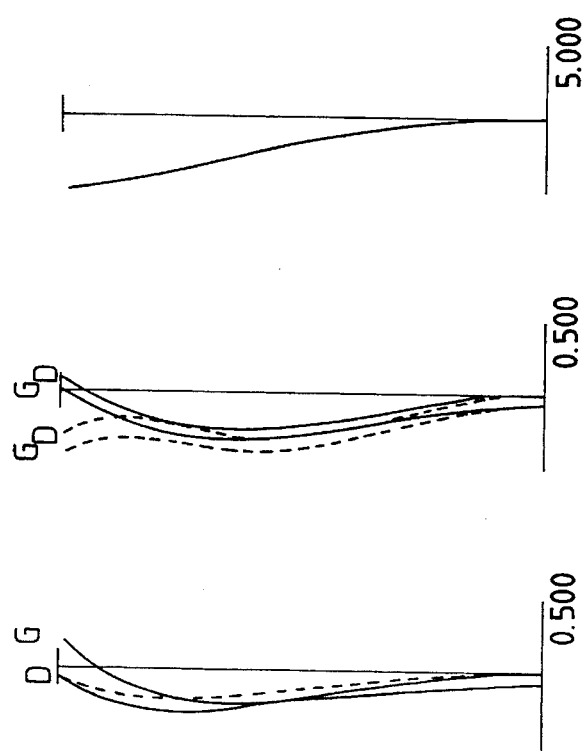
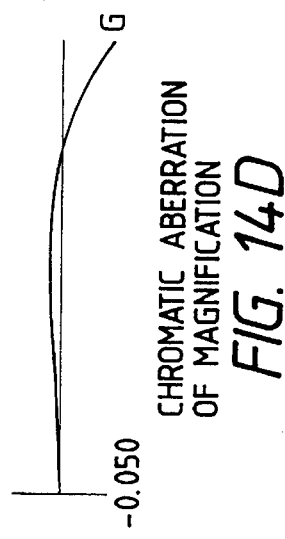

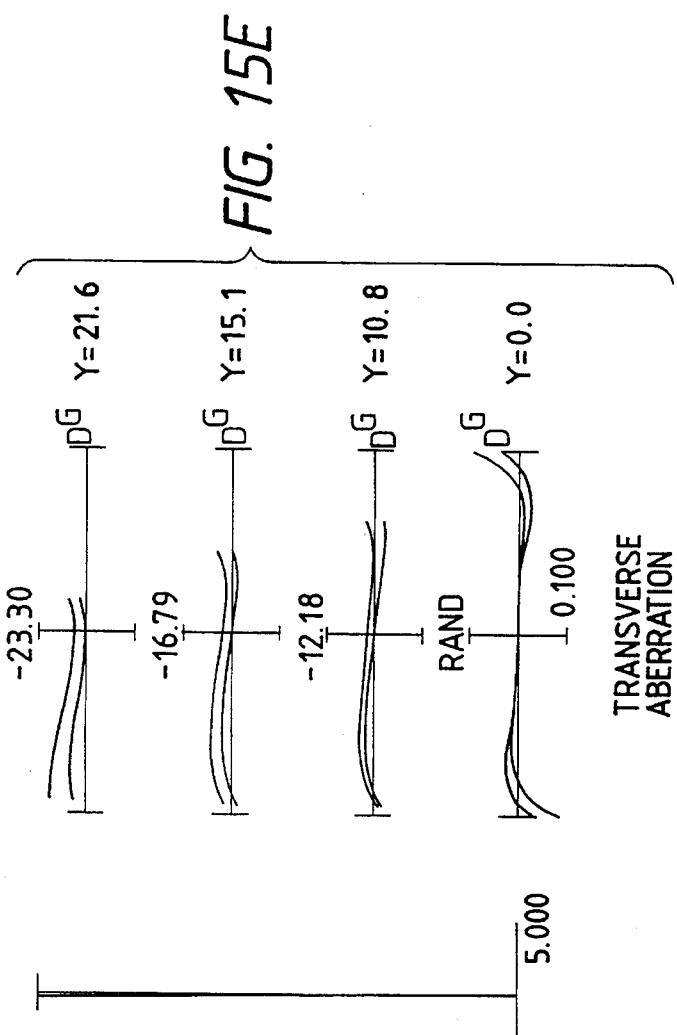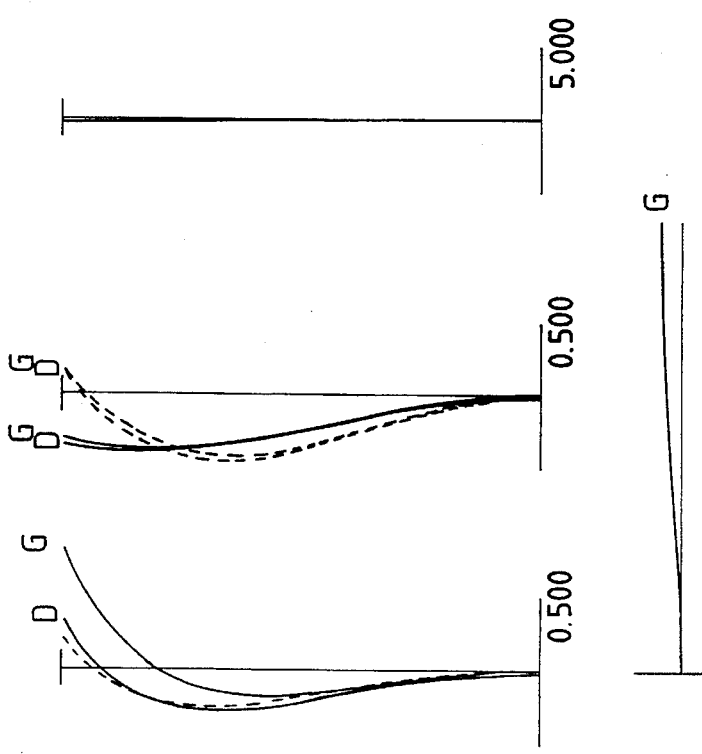

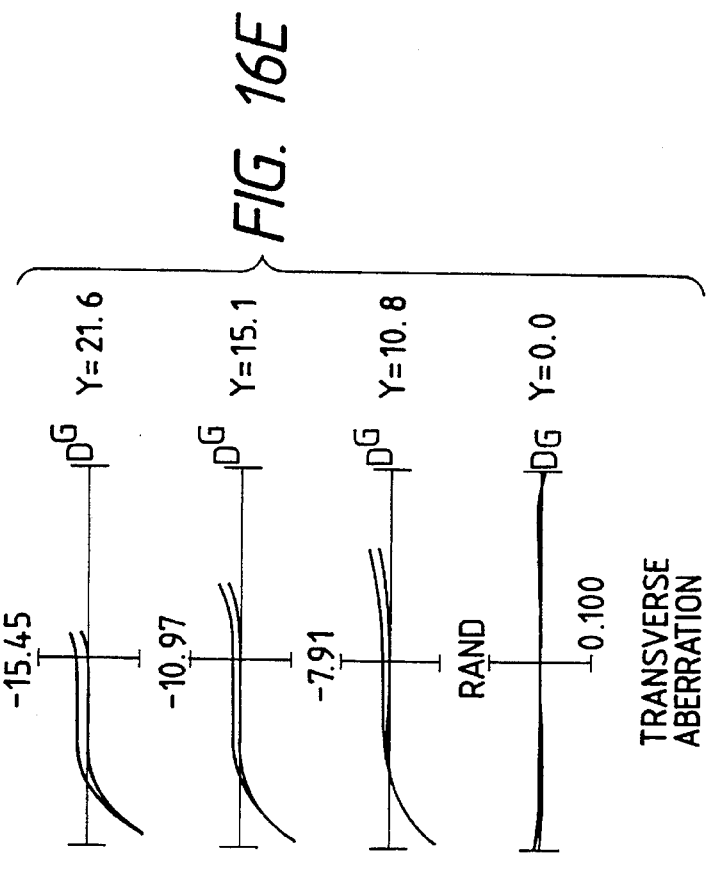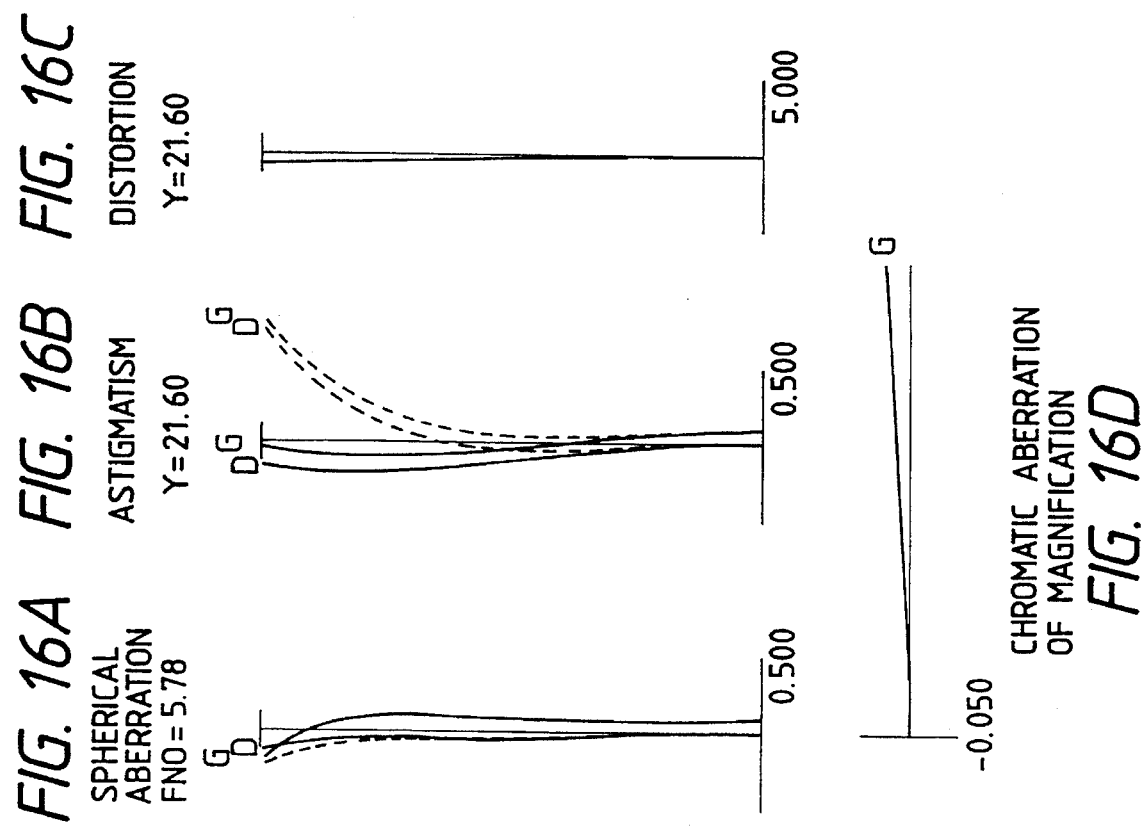

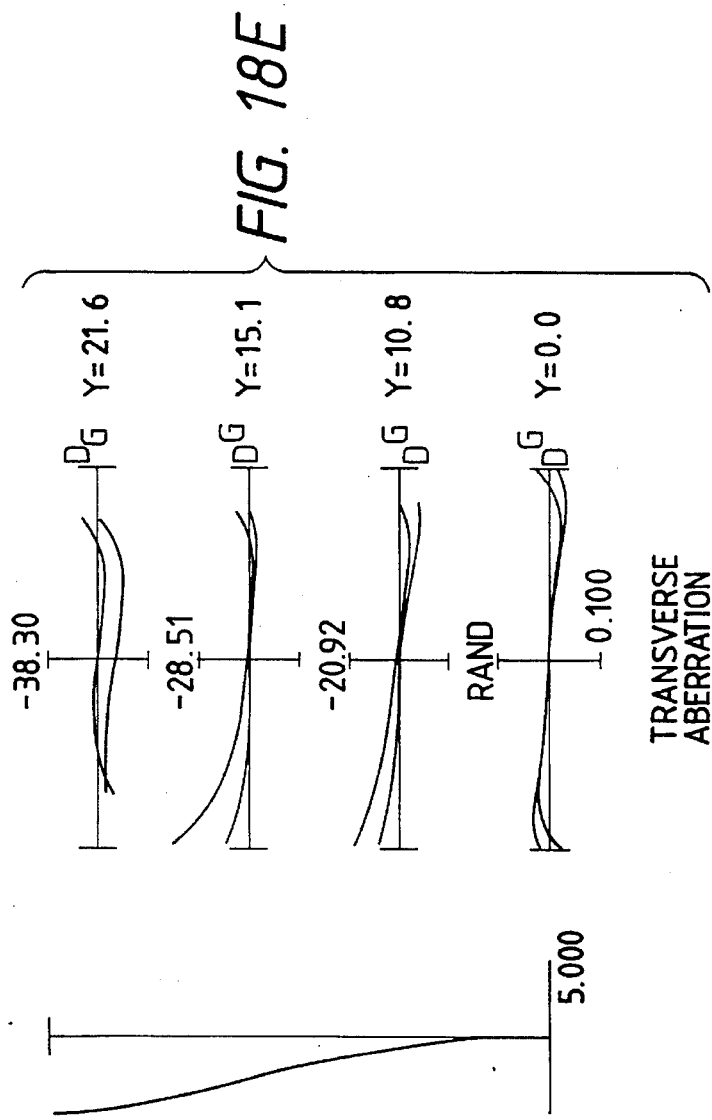
FIG. 18A SPHERICAL ABERRATION FNO=3.59
FIG. 18B ASTIGMATISM Y=21.60
FIG. 18C DISTORTION Y=21.60
FIG. 18D CHROMATIC ABERRATION OF MAGNIFICATION
FIG. 18E TRANSVERSE ABERRATION

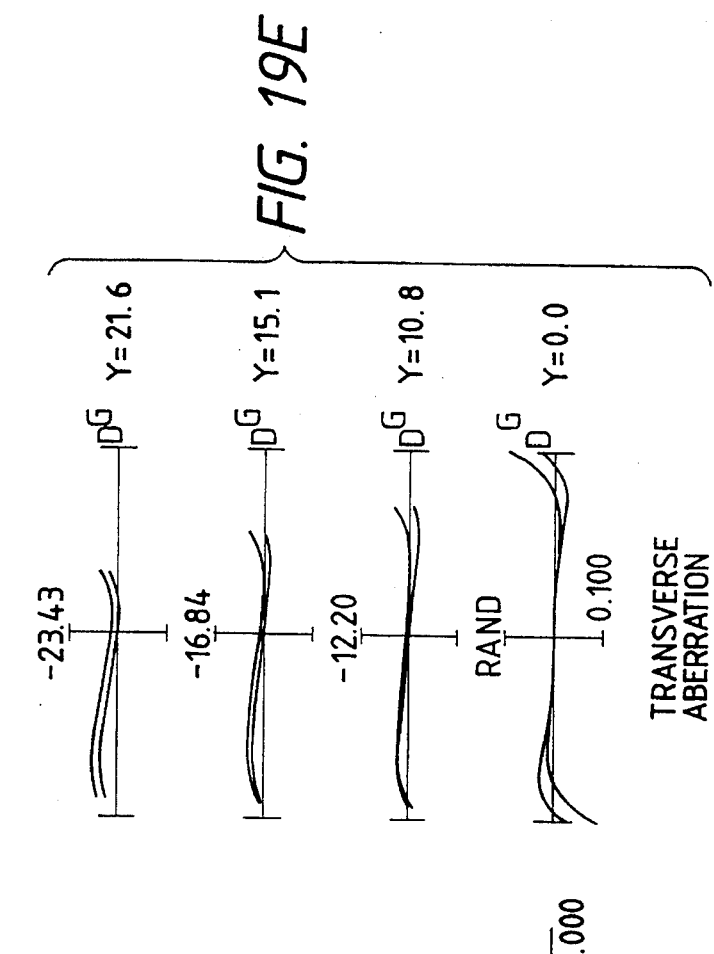

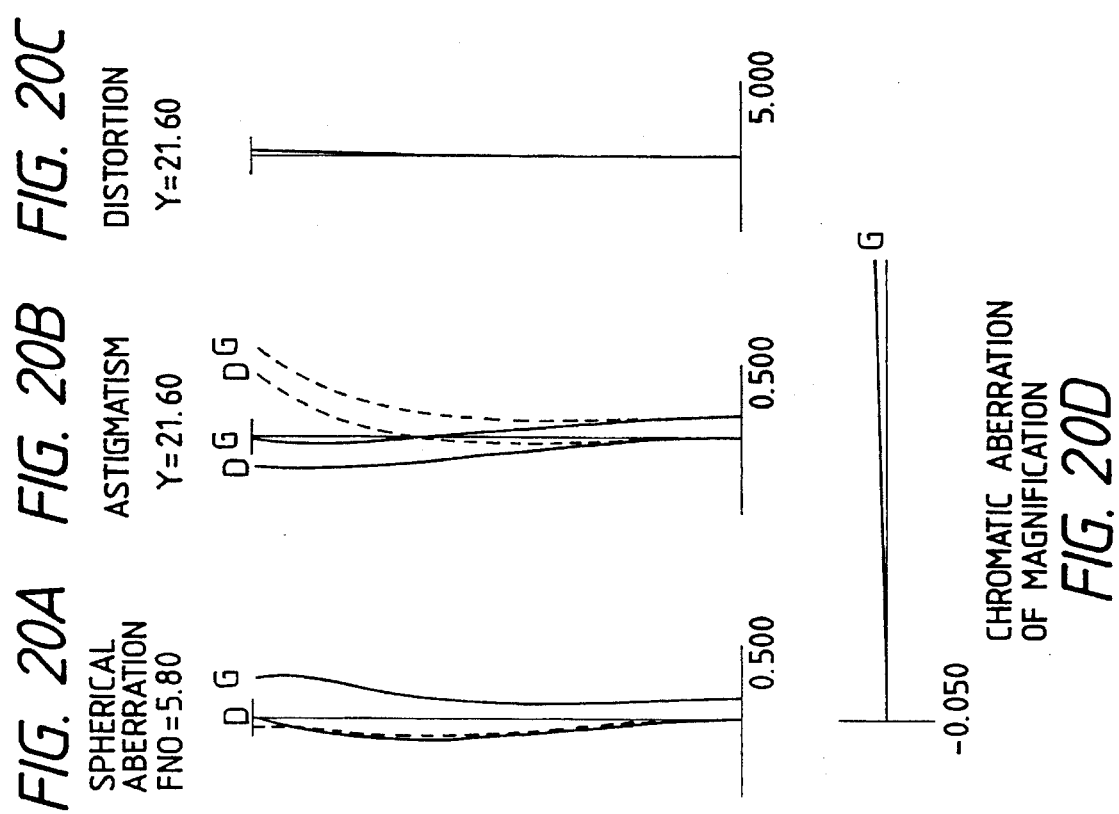

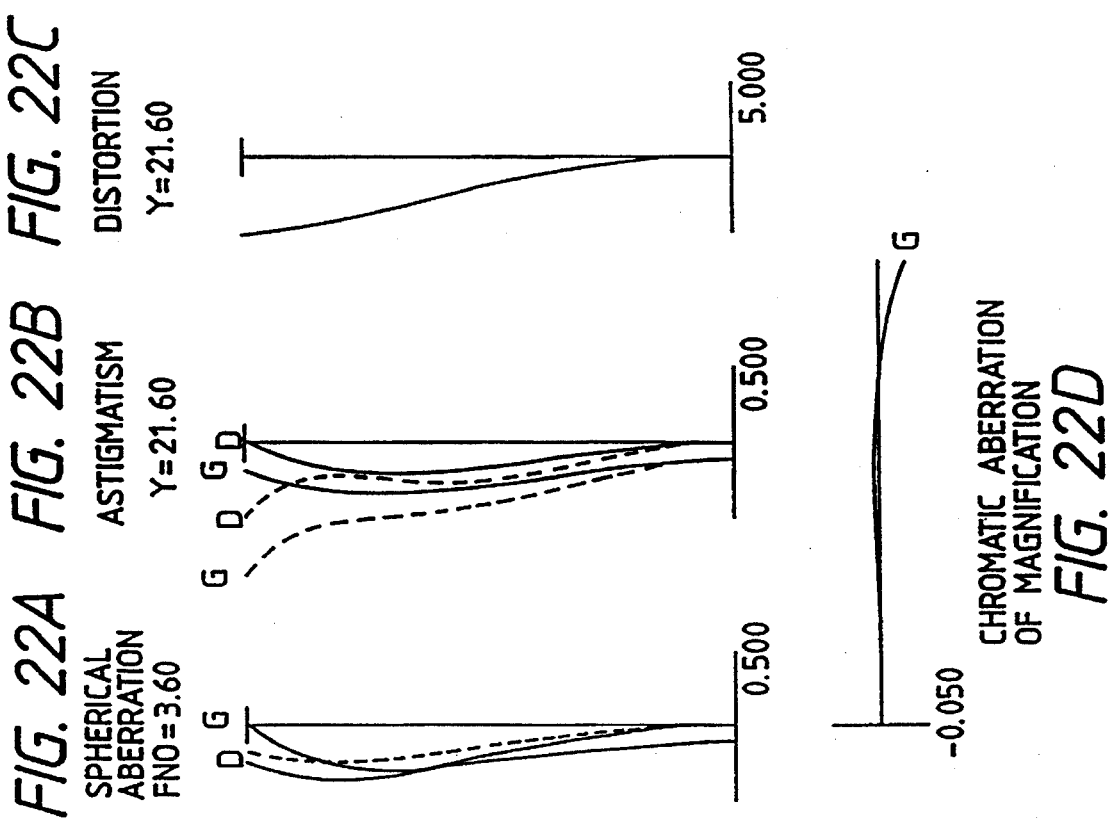

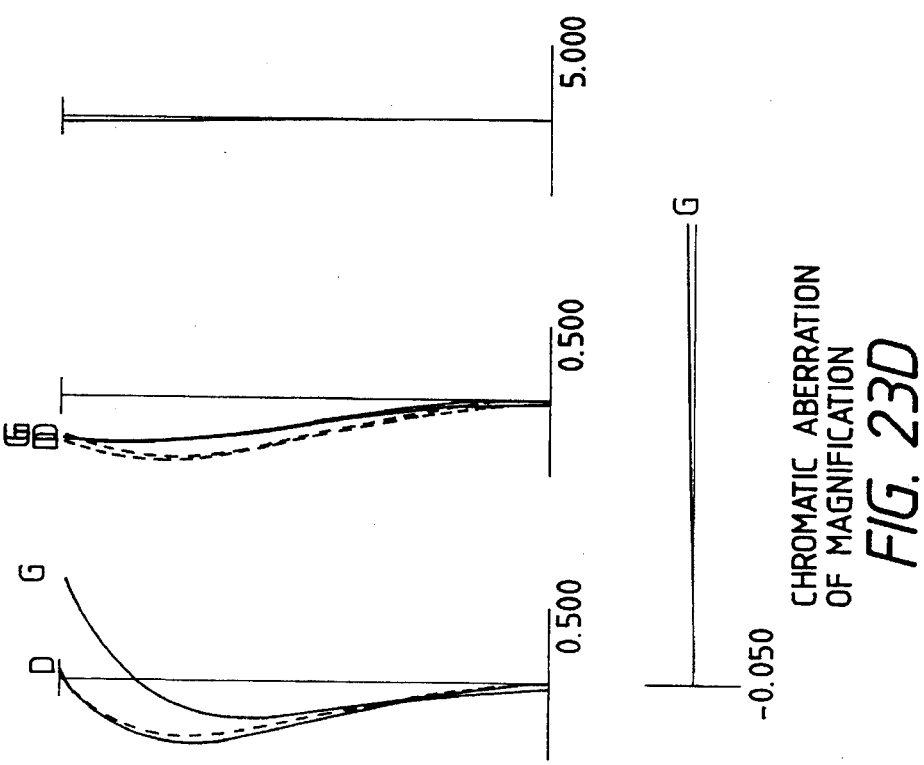
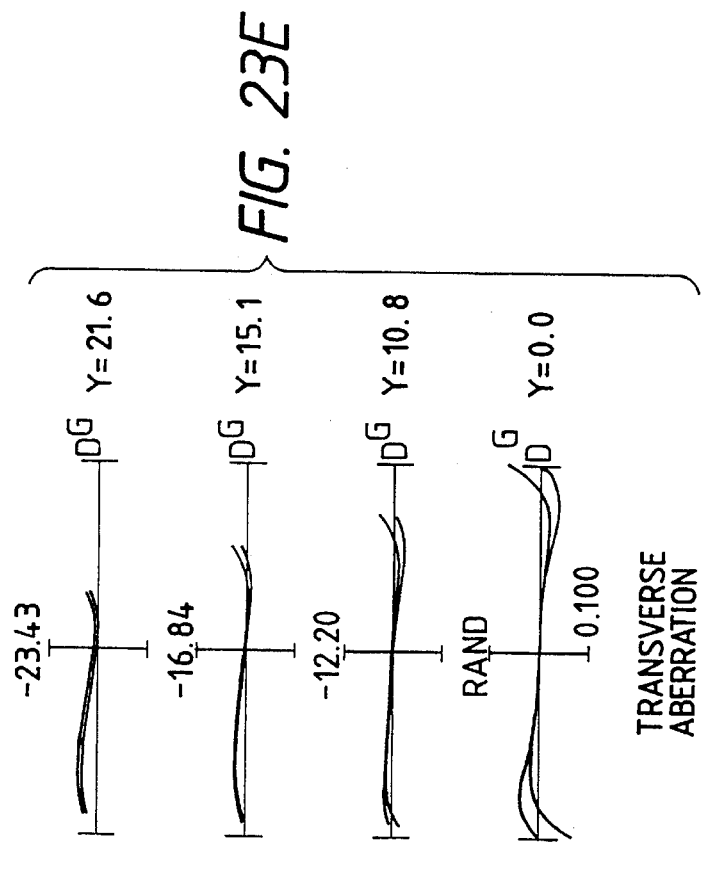
FIG. 23A SPHERICAL ABERRATION FNO=4.61
FIG. 23B ASTIGMATISM Y=21.60
FIG. 23C DISTORTION Y=21.60
FIG. 23D CHROMATIC ABERRATION OF MAGNIFICATION
FIG. 23E TRANSVERSE ABERRATION

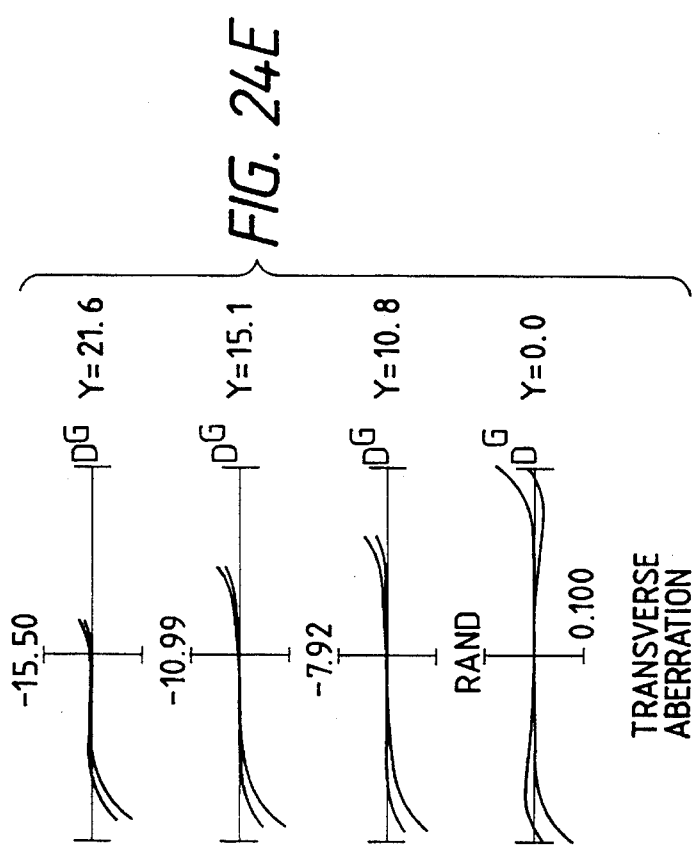
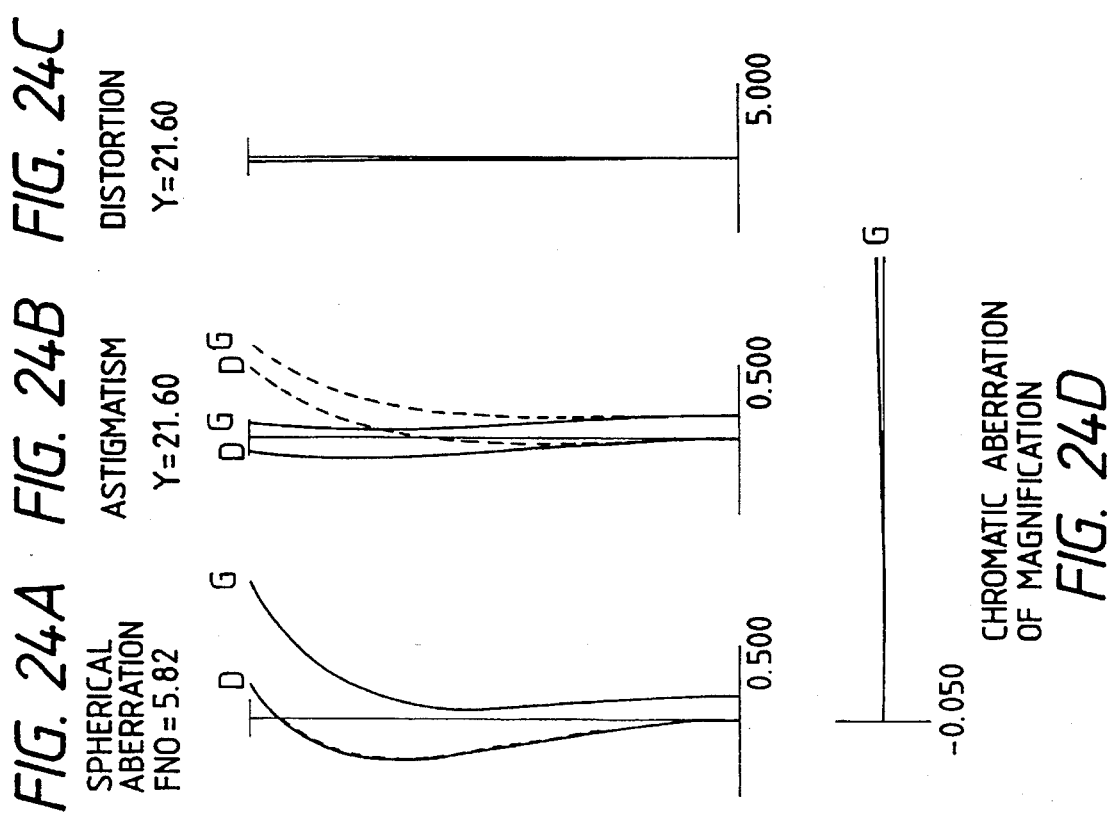

STANDARD ZOOM LENS

BACKGROUND OF THE INVENTION

1. Field of the Invention

The present invention relates to a standard zoom lens and, more particularly, to a compact standard zoom lens with a high zoom ratio.

2. Related Background Art

In recent years, in exchangeable lenses for 35-mm still cameras, it has become a general practice to provide a zoom lens in place of a standard lens (a lens having a focal length of about 50 mm in the case of 35-mm format cameras). The zoom lens usually has a zoom ratio of about x2.5, a standard field angle, and includes two lens units having negative and positive refractive powers, respectively, in order from the object side (hereinafter referred to as a standard zoom lens).

Therefore, since the above-mentioned standard zoom lens is carried while being attached to a camera body as a lens to be ordinarily used, not only must it have a minimum required compact structure as an indispensable condition, but also it must be inexpensive while maintaining sufficient imaging performance.

In order to realize such a so-called standard zoom lens, the above-mentioned negative/positive two-unit zoom lens is the most suitable lens type, and various proposals have been made.

For example, Japanese Laid-Open Patent Application No. 52-135750 proposes a two-unit zoom lens which has a first lens unit constituted by three lenses, i.e., negative, negative, and positive lenses. On the other hand, Japanese Laid-Open Patent Application No. 4-251211 proposes a two-unit zoom lens which decreases the number of constituting lenses to further reduce the lens size and cost, and realizes a high zoom ratio.

Furthermore, Japanese Laid-Open Patent Application No. 5-249376 proposes a two-unit zoom lens which adopts a first lens unit constituted by two lenses, i.e., negative and positive lenses, so as to further reduce the lens size and cost.

However, the zoom lens disclosed in Japanese Laid-Open Patent Application No. 52-135750 is large in size and requires a large filter size, and has a zoom ratio as low as 1.8 to 1.9. Therefore, this zoom lens is inferior to modern zoom lenses in terms of portability and specifications.

The zoom lens disclosed in Japanese Laid-Open Patent Application No. 4-251211 has an improved design to attain a certain decrease in size and a decrease in the number of constituting lenses, and the zoom ratio can cover a range from about x2.5 to about x2.7. However, in this zoom lens, the attained size reduction is not sufficient, and a further size reduction is desired. In particular, this zoom lens has a refractive power arrangement, so that the total lens length at the telephoto end becomes shorter than that at the wide-angle end, and a further size reduction at the wide-angle end and a decrease in diameter are not still attained.

Also, problems associated with aberration correction such as a large variation and absolute amount of the spherical aberration upon zooming, insufficient correction of the curvature of field, and the like remain unsolved. Therefore, a high-performance zoom lens whose size and diameter can be further reduced without considerably increasing the number of constituting lenses, and can solve the above-mentioned problems associated with aberration correction, is demanded.

Furthermore, Japanese Laid-Open Patent Application No. 5-249376 discloses a negative/positive two-unit zoom lens which has a first lens unit constituted by a smaller number of lenses, as described above. The zoom lens disclosed in Japanese Laid-Open Patent Application No. 5-249376 realizes a high zoom ratio and high performance while further reducing the size, in the optical axis direction, of the first lens unit. However, since the first lens unit is constituted by two lenses, the refractive power of the negative lens in the first lens unit becomes relatively strong, and the deviation (the difference, in the optical axis direction, between the mother spherical surface in a paraxial region and the aspherical surface) tends to be relatively large.

Therefore, it is difficult to manufacture the above-mentioned negative lens using the current manufacturing methods such as a method of manufacturing the negative lens as a compound aspherical lens consisting of glass and a plastic material, a method of manufacturing the negative lens by glass direct press, and the like. For this reason, not only the manufacturing cost increases, but also it tends to become difficult to ensure certain tolerances as to deterioration of performance caused by water/moisture absorption, a change in temperature, and the like of a resin portion in association with aberration requirements in the compound aspherical lens even if such a lens can, in fact, be manufactured.

SUMMARY OF THE INVENTION

The present invention has been made in consideration of the above-mentioned problems. An object of the present invention is to provide a standard zoom lens, which has a high zoom ratio and a small size due to a small number of constituting lenses, and can realize relatively easy manufacture, low cost, and high mass-productivity.

A zoom lens according to the present invention comprises, in the following order from the object side, a first lens unit G1 having a negative refractive power as a whole, and a second lens unit G2 having a positive refractive power as a whole, and effects zooming by changing an air gap between the first and second lens units G1 and G2. The first lens unit G1 comprises, in the following order from the object side, a first negative meniscus lens L1 with a concave surface having a more intense curvature and facing the image side, a second negative meniscus lens L2 with a concave surface having a more intense curvature and facing the image side, and a positive lens L3 with a convex surface facing the object side. The second lens unit G2 comprises, in the following order from the object side, a positive lens component L4 having at least two positive lenses, a negative lens component L5, and a positive lens component L6. At least one of the lens surfaces constituting the first lens unit G1 is an aspherical surface. The zoom lens satisfies the following conditions:

$$0.6 < |f1|/(fw \cdot ft)^{1/2} < 1.0$$

$$0.13 < d45/d2 < 0.5$$

where f1 is the focal length of the first lens unit, fw is the focal length of the entire lens system at the wide-angle end, ft is the focal length of the entire lens system at the telephoto end, d2 is the total on-axis thickness of the second lens unit G2, and d45 is the on-axis air gap between the positive and negative lens components L4 and L5 in the second lens unit G2.

According to a preferred aspect of the present invention, the zoom lens satisfies the following condition:

$$1.786 < (n1+n2)/2 < 2$$

where n1 is the refractive index for the d-line of the first negative meniscus lens L1 in the first lens unit G1, and n2 is the refractive index for the d-line of the second negative meniscus lens L2. Furthermore, at least one lens surface of the first and second negative meniscus lenses L1 and L2 in the first lens unit G1 is preferably an aspherical surface.

The lens arrangement of the first lens unit G1 of the zoom lens of the present invention will be described below.

According to the present invention, the first lens unit G1 comprises, in the following order from the object side, the first negative meniscus lens L1, the second negative meniscus lens L2, and the positive lens L3. In this manner, the first lens unit G1 is basically constituted by three lenses, and at least one lens surface of these lenses is an aspherical surface. In particular, one of the lens surfaces of the first and second negative meniscus lenses L1 and L2 is preferably an aspherical surface.

Since the first and second negative lenses have a meniscus shape, it is particularly advantageous to correct the lower coma (a coma formed by rays with a higher ray height than that of a principal ray of incident oblique rays), curvature of field, and astigmatism at the wide-angle side. In addition, the aspherical surface can provide an effect of assisting correction of the lower coma and distortion, and the spherical aberration at the telephoto side.

With the above-mentioned arrangement, the first lens unit G1 can have a relatively strong refractive power, and a decrease in size and a decrease in filter size can be realized. Furthermore, if the first lens unit G1 is considered to be constituted by two, i.e., negative and positive lens components, the negative lens component is constituted by two negative meniscus lenses. Therefore, the refractive powers of the negative meniscus lenses can be reduced, and the deviation of the aspherical surface can also be reduced. In this manner, the arrangement of the first lens unit is advantageous in terms of manufacture of lens components and of deterioration of performance due to chemical and physical changes, as described above.

The relationship between the refractive power of the first lens unit G1 and the total lens length (the distance from a surface, closest to the object side, of the first lens unit G1 to the image plane) will be explained below.

In general, in a negative/positive two-unit zoom lens, when a relation given by equation (a) below is established, the total lens length at the wide-angle end becomes equal to that at the telephoto end, and a change in total length of the lens upon zooming is minimized:

$$f1 = -(fw \cdot ft)^{1/2} \qquad (a)$$

where fw is the focal length of the entire lens system at the wide-angle end, ft is the focal length of the entire lens system at the telephoto end, and f1 is the focal length of the first lens unit G1.

Therefore, when the focal length f1 of the first lens unit G1 deviates considerably from the range of the relation given by equation (a), a change in total length of the lens upon zooming undesirably becomes too large.

Also, a relation given by equation (b) below holds in a lens of the above-mentioned type:

$$ft = f1 \cdot \beta t \qquad (b)$$

where β is the magnification, at the telephoto end, of the second lens unit G2 as a convergent lens unit.

In order to realize a compact structure (a size reduction) of the zoom lens, the second lens unit G2 must be used at a magnification exceeding an equal magnification at the telephoto end. In order to realize a compact zoom lens which can satisfy the relations given by equations (a) and (b) above while achieving satisfactory aberration correction, the respective lens units must have relatively strong refractive powers. Therefore, in the conventional zoom lens, each lens unit tends to be constituted by many lenses. As a result, the total thickness of each lens unit increases, and the size reduction effect is lost.

However, in the zoom lens of the present invention, unlike in the prior art, since the first lens unit G1 is constituted by three lenses, i.e., negative, negative, and positive lenses, and takes the relations given by equations (a) and (b) into consideration, a refractive power arrangement suitable for a compact structure is set.

Furthermore, in order to reduce the filter size and to increase the amount of marginal rays upon focusing at especially a near distance, the focal length f1 of the first lens unit G1 in equation (a) is set to be relatively smaller than that in the prior art so as to decrease the moving amount of the lens unit G1 upon focusing.

In this manner, according to the present invention, a compact and low-cost standard zoom lens, which has a small change in total lens length upon zooming, a small filter size but a sufficient amount of marginal rays, and a small moving amount of the focusing lens unit upon focusing, can be realized.

Conditional formulas of the present invention will be explained below.

In the zoom lens of the present invention, the second lens unit G2 comprises, in the following order from the object side, the positive lens component L4 having at least two positive lenses, the negative lens component L5, and the positive lens component L6, and satisfies conditional formulas (1) and (2) below. Note that the reason why the second lens unit G2 has such an arrangement will be explained later.

$$0.6 < |f1|/(fw \cdot ft)^{1/2} < 1.0 \qquad (1)$$

$$0.13 < d45/d2 < 0.5 \qquad (2)$$

where f1: the focal length of the first lens unit G1 fw: the focal length of the entire lens system at the wide-angle end ft: the focal length of the entire lens system at the telephoto end d45: the on-axis air gap between the positive and negative lens components L4 and L5 in the second lens unit G2 d2: the total on-axis thickness of the second lens unit G2

Note that the total on-axis thickness of the second lens unit G2 is the distance between a lens surface closest to the object side and a lens surface closest to the image side along the optical axis in the second lens unit G2.

Conditional formula (1) is a formula associated with the change in total lens length in the entire zooming region, as has been described above in association with equation (a). When the value of formula (1) exceeds 1.0, this means that the total lens length at the wide-angle end is maximized; when the value of conditional formula (1) is smaller than 1.0, this means that the total lens length at the telephoto end is maximized.

Therefore, when $|f1|/(fw \cdot ft)^{1/2}$ exceeds the upper limit value of conditional formula (1), the total lens length at the wide-angle end is maximized. As a result, since the incident height of oblique rays at the wide-angle end becomes considerably large, the diameter of a front-lens element undesirably increases, and the amount of marginal rays undesirably becomes insufficient. In addition, since the lens moving amount upon focusing increases, not only the amount of marginal rays decreases especially in a closest-distance photographing operation, but also a so-called eclipse of a principal ray occurs upon movement of the lens upon focusing due to an increase in incident height of the principal ray. For these reasons, it becomes difficult to decrease the closest distance.

Note that the decreases in lens size and filter size, and the increase in amount of marginal rays can be promoted and the effect of the present invention can be further improved by setting the upper limit value of conditional formula (1) to be 0.996 or less.

On the contrary, when $|f1|/(fw \cdot ft)^{1/2}$ is smaller than the lower limit value of conditional formula (1), it is advantageous to decrease the filter size and to assure a sufficient amount of marginal rays. However, in the case of a zoom lens with a high zoom ratio like in the present invention, it not only becomes difficult to correct the spherical aberration at the telephoto side, but also the lower coma is undesirably worsened, resulting in a negative coma.

Note that the imaging performance can be further improved by setting the lower limit value of conditional formula (1) to be 0.7 or more.

Conditional formula (2) defines an appropriate range associated with the on-axis air gap between the positive and negative lens components L4 and L5 in the second lens unit G2.

In general, the second lens unit in the negative/positive two-unit zoom lens frequently has an Ernostar or Sonnar type structure. This structure allows the principal point of the second lens unit to be located at a position closer to the object side, and a relatively large lens diameter can be assured.

Furthermore, when both the first and second lens units have strong refractive powers, the principal point of the second lens unit must be located at a position closer to the object side. If the principal point of the second lens unit cannot be located at a position sufficiently closer to the object side, the dead space between the first and second lens units becomes insufficient. Therefore, in the case of the present invention as well, the second lens unit G2 basically has an Ernostar type arrangement constituted by positive, positive, negative, and positive lenses, and a large air gap is assured between the positive and negative lens components L4 and L5 at the object side, so that the principal point of the second lens unit G2 is located at a position closer to the object side.

When the air gap between the positive and negative lens components L4 and L5 is appropriately widened, the spherical aberration especially at the telephoto side can be satisfactorily corrected. Therefore, in order to realize decreases in lens size and filter size by setting a relatively strong refractive power of the first lens unit G1 in conditional formula (1), a sufficient air gap must be assured between the positive and negative lens components L4 and L5 in the second lens unit G2.

When d45/d2 exceeds the upper limit value of conditional formula (2), the on-axis air gap d45 between the positive and negative lens components L4 and L5 becomes too large as compared to the total on-axis thickness d2 of the second lens unit G2. Therefore, in particular, when the second lens unit G2 is constituted by four lenses as the minimum number of lenses, since the positive lens component L4 does not include any negative lens, it becomes difficult to correct an on-axis chromatic aberration, especially, to suppress any variation upon zooming when the air gap d45 becomes too large.

On the other hand, when d45/d2 exceeds the upper limit value of conditional formula (2), this also means that the total on-axis thickness of the second lens unit G2 decreases considerably. Therefore, not only it becomes difficult to correct the spherical aberration and upper coma at the telephoto side, but also variations of an on-axis chromatic aberration and chromatic aberration of magnification upon zooming undesirably increase.

When the upper limit value of conditional formula (2) is set to be 0.4 or less, aberration correction can be more satisfactorily achieved. When the upper limit value of conditional formula (2) is set to be 0.35 or less, and more preferably, 0.3 or less, the effect of the present invention can be provided more reliably.

On the contrary, when d45/d2 is smaller than the lower limit value of conditional formula (2), a sufficient dead space between the first and second lens units G1 and G2 cannot be assured, as described above, and a higher zoom ratio cannot be realized. In view of aberration correction, it becomes difficult to correct the spherical aberration especially at the telephoto side, and a variation of the spherical aberration upon zooming increases, resulting in an increase in the number of constituting lenses in a high-zoom ratio compact zoom lens with a small filter size as in one according to the present invention.

When the lower limit value of conditional formula (2) is set to be 0.15 or more, aberration correction can be attained more satisfactorily, and decreases in lens size, filter size, and cost can be realized more easily. When the lower limit value of conditional formula (2) is suppressed to be 0.16 or more, and more preferably, 0.18 or more, the effect of the present invention can be provided more reliably.

In addition to the above-mentioned conditions, the zoom lens of the present invention preferably satisfies the following conditional formula (3):

$$1.786 < (n1+n2)/2 < 2 \qquad (3)$$

where n1: the refractive index for the d-line of the first negative meniscus lens L1 n2: the refractive index for the d-line of the second negative meniscus lens L2

Conditional formula (3) defines the average refractive index of the two negative meniscus lenses in the first lens unit G1.

In the case of a so-called compound aspherical lens consisting of a resin material and a glass material, it is hard to assume the resin material portion to be a single lens component in view of the refractive index. More specifically, since the resin material portion cannot exist as an independent lens component, the compound aspherical lens cannot be considered in the same manner as a so-called cemented lens. Therefore, the resin material portion should rather be considered as a function added to the glass material portion. More specifically, the average refractive index of the two negative meniscus lenses in the first lens unit G1 should be calculated based on only the refractive indices of the glass lens portions as base bodies.

Therefore, in conditional formula (3) of the present invention, when a compound aspherical surface is used, the average refractive index is calculated based on only the refractive indices of the base body glass lens portions.

When the average refractive index exceeds the upper limit value of conditional formula (3), since the average refractive index becomes large, the curvatures of the lenses can be decreased (the radii of curvature can be increased), and the degree of freedom upon aberration correction advantageously increases. However, in the existing glass material, when the refractive index is increased, the dispersion becomes too large, and it becomes difficult to achieve achromatization in the first lens unit G1. From the chemical viewpoint, since the transmittance of light at short wavelengths tends to decrease, the color balance of the lens as a whole tends to deteriorate.

On the other hand, when the average refractive index is smaller than the lower limit value of conditional formula (3), in the case of a compact, low-cost zoom lens having a first lens unit G1 with a strong refractive power like in the present invention, the curvatures of the lenses considerably increase (the radii of curvature decrease) to considerably generate various aberrations on the respective lens surfaces, and the degree of freedom upon correction of these aberrations becomes insufficient. As a result, it becomes difficult to correct the curvature of field, astigmatism, and lower coma, and marginal performance especially at the wide-angle side deteriorates.

When the lower limit value of conditional formula (3) is set to be 1.79 or more, aberration correction can be attained more satisfactorily. When the lower limit value of conditional formula (3) is suppressed to be 1.8 or more, and more preferably, 1.83 or more, the marginal performance at the wide-angle side can be further improved, and the zoom lens can be rendered further compact.

In addition to the above-mentioned conditions, the zoom lens of the present invention preferably satisfies the following conditional formula (4):

$$0.2 < d4/d2 < 0.5 \tag{4}$$

where d4: the total on-axis thickness of the positive lens component L4 in the second lens unit G2.

Conditional formula (4) defines an appropriate range of the total on-axis thickness of the positive lens component L4 in the second lens unit G2.

When d4/d2 exceeds the upper limit of conditional formula (4), the total on-axis thickness d4 of the positive lens component L4 becomes too large as compared to the total on-axis thickness d2 of the second lens unit G2, and a sufficient dead space cannot be assured between the first and second lens units G1 and G2. As a result, not only the zoom ratio cannot be increased, but also it becomes difficult to decrease the total lens length and filter size.

On the other hand, when d4/d2 exceeds the upper limit of conditional formula (4), this also means considerable decreases in thickness of the negative and positive lens components L5 and L6 in the second lens unit G2 and a decrease in interval therebetween. For this reason, when d4/d2 exceeds the upper limit of conditional formula (4), it not only becomes difficult to correct the spherical aberration and upper coma, but also a variation of the chromatic aberration of magnification upon zooming undesirably increases.

When the upper limit value of conditional formula (4) is set to be 0.45 or less, the effect of the present invention can be enhanced. When the upper limit value of conditional formula (4) is suppressed to be 0.4 or less, and more preferably, 0.39 or less, the effect of the present invention can be provided more reliably.

On the contrary, when d4/d2 is smaller than the lower limit of conditional formula (4), it becomes difficult to correct the spherical aberration especially at the telephoto end. In this case, since the thickness of the positive lens component L4 in the second lens unit G2 becomes too small, its edge thickness becomes extremely small, and this is not preferable in the manufacture of a lens component.

Furthermore, in addition to the above-mentioned conditions, the zoom lens of the present invention preferably satisfies the following conditional formula (5):

$$1.2 < X2/fw < 2.5 \tag{5}$$

where

X2: the moving amount of the second lens unit G2 upon zooming

Conditional formula (5) defines a proper range of the moving amount of the second lens unit G2 upon zooming.

When X2/fw exceeds the upper limit value of conditional formula (5), the moving amount of the second lens unit G2 upon zooming becomes too large, and lens barrel design becomes difficult to achieve. In addition, the lens size undesirably tends to increase, contrary to the object of the present invention.

Since an increase in moving amount of the second lens unit G2 upon zooming means an increase in change amount of a full-open f-number upon zooming, the f-number consequently becomes large (dark) at the telephoto side.

When the upper limit value of conditional formula (5) is set to be 2 or less, the zoom lens can be rendered further compact. More preferably, when the upper limit value of conditional formula (5) is suppressed to be 1.8 or less, the effect of the present invention can be provided more reliably.

On the contrary, when X2/fw is smaller than the lower limit value of conditional formula (5), it becomes impossible to assure a sufficient zoom ratio, and a compact, low-cost zoom lens with a high zoom ratio cannot be realized.

When a high zoom ratio is realized by increasing the refractive power of the second lens unit G2, a variation of aberrations upon zooming considerably increases. In particular, variations of the spherical aberration and curvature of field upon zooming considerably increase.

When the lower limit value of conditional formula (5) is changed to be 1.26 or more, and more preferably, 1.3 or more, the effect of the present invention can be provided more reliably.

The zoom lens of the present invention preferably satisfies at least one of the following conditional formulas (6) to (8):

$$23 < (vd1 + vd2)/2 < 49 \tag{6}$$

$$1.47 < n4 < 1.64 \tag{7}$$

$$54 < vd4 \tag{8}$$

where vd1: the Abbe's number of the first negative meniscus lens L1 in the first lens unit G1 vd2: the Abbe's number of the second negative meniscus lens L2 in the first lens unit G1 n4: the average value of the refractive indices for the d-line of all the positive lenses in the positive lens component L4 in the second lens unit G2 vd4: the average value of the Abbe's numbers of all the positive lenses in the positive lens component L4 in the second lens unit G2

Conditional formula (6) defines a proper range of the average value of the Abbe's numbers of the first and second meniscus lenses L1 and L2 in the first lens unit G1.

When the average value exceeds the upper limit value of conditional formula (6), the degree of freedom for achromatization increases, but a high refractive index cannot be obtained in practice. As a result, the degree of freedom upon correction of a monochromatic aberration is lowered, and in particular, the lower coma cannot be satisfactorily corrected.

When the upper limit value of conditional formula (6) is set to be 48 or less, and more preferably, 47 or less, a better balance can be obtained, and the effect of the present invention can be provided more reliably.

On the contrary, when the average value is smaller than the lower limit value of conditional formula (6), since the dispersion considerably increases, achromatization in the first lens unit G1 becomes insufficient, and both the on- and off-axis chromatic aberrations are undesirably worsened.

When the lower limit value of conditional formula (6) is set to be 25 or more, and more preferably, 30 or more, the effect of the present invention can be provided more reliably.

As has already been described above in the paragraph regarding conditional formula (3) in association with the refractive index, conditional formula (6) adopts a value calculated based on the Abbe's numbers of the glass lens portions when the lenses include a so-called compound aspherical surface.

Conditional formula (7) defines a proper range of the average value of the refractive indices for the d-line ($\lambda=587.6$ nm) of all the positive lenses in the positive lens component L4 including at least two positive lenses.

When the average value exceeds the upper limit value of conditional formula (7), in the case of a compact zoom lens constituted by a small number of lenses like in the present invention, the Petzval sum becomes too small, and the correction performance of the curvature of field and astigmatism consequently deteriorates.

When the upper limit value of conditional formula (7) is suppressed to be 1.62 or less, the effect of the present invention can be provided more reliably.

On the contrary, when the average value is smaller than the lower limit value of conditional formula (7), the degree of freedom upon correction of a spherical aberration is lowered, and it undesirably becomes difficult to correct the spherical aberration especially at the telephoto side.

When the lower limit value of conditional formula (7) is changed to be 1.5 or more, the effect of the present invention can be provided more reliably.

Conditional formula (8) defines a proper range of the average value of the Abbe's numbers of all the positive lenses in the positive lens component L4 in the second lens unit G2.

When the average value falls outside the range defined by conditional formula (8), achromatization in the second lens unit G2 becomes insufficient, and, in particular, it undesirably becomes difficult to correct the on-axis chromatic aberration.

Furthermore, the zoom lens of the present invention preferably satisfies at least one of the following conditional formulas (9) to (11):

$$1.1 < f2/fw < 1.5 \quad (9)$$

$$0.05 < d23/fw < 0.3 \quad (10)$$

$$0 < |AS-S|/|fAS| < 0.04 \quad (11)$$

where d23: the on-axis air gap between the second negative meniscus lens L2 and the positive lens L3 in the first lens unit G1

AS–S: the difference (deviation), in the optical axis direction, between an aspherical surface in the outermost peripheral region of the effective diameter of the aspherical surface, and its paraxial reference spherical surface fAS: the focal length of the lens with the aspherical surface Conditional formula (9) defines a condition associated with the focal length of the second lens unit G2.

When f2/fw exceeds the upper limit value of conditional formula (9), since the refractive power of the second lens unit G2 becomes small, the moving amount upon zooming increases, and this undesirably results in an increase in lens size.

On the contrary, when f2/fw is smaller than the lower limit value of conditional formula (9), the refractive power of the second lens unit G2 becomes too small to sufficiently reduce any remaining aberrations with a small number of constituting lenses. In particular, correction of the spherical aberration becomes difficult to achieve.

When the lower limit value of conditional formula (9) is set to be 1.2 or more, the effect of the present invention can be provided more effectively.

Conditional formula (10) defines the on-axis air gap between the second negative meniscus lens L2 and the positive lens L3 in the first lens unit G1.

When d23/fw exceeds the upper limit value of conditional formula (10), a sufficient dead space cannot be assured between the first and second lens units G1 and G2, and a high zoom ratio cannot be assured.

When the upper limit value of conditional formula (10) is suppressed to be 0.25 or less, the effect of the present invention can be provided more reliably.

On the contrary, when d23/fw is smaller than the lower limit value of conditional formula (10), it becomes difficult to correct the lower coma especially at the wide-angle side.

Condition formula (11) defines a conditional associated with the deviation of the aspherical surface used in the lens surfaces in the first lens unit.

When |AS–S|/|fAS| exceeds the upper limit value of conditional formula (11), it becomes difficult to manufacture the aspherical lens in practice due to the above-mentioned problems associated with the manufacture.

When the upper limit value of conditional formula (11) is suppressed to 0.035 or less, the effect of the present invention can be provided more reliably.

The preferred embodiments of the present invention will be described below with reference to the accompanying drawings.

BRIEF DESCRIPTION OF THE DRAWINGS

FIGS. 2A to 2E are graphs showing various aberrations at the wide-angle end in the first embodiment;

FIGS. 3A to 3E are graphs showing various aberrations in a middle focal length state in the first embodiment;

FIGS. 4A to 4E are graphs showing various aberrations at the telephoto end in the first embodiment;

FIGS. 6A to 6E are graphs showing various aberrations at the wide-angle end in the second embodiment;

FIGS. 7A to 7E are graphs showing various aberrations in a middle focal length state in the second embodiment;

FIGS. 8A to 8E are graphs showing various aberrations at the telephoto end in the second embodiment;

FIGS. 10A to 10E are graphs showing various aberrations at the wide-angle end in the third embodiment;

FIGS. 11A to 11E are graphs showing various aberrations in a middle focal length state in the third embodiment;

FIGS. 12A to 12E are graphs showing various aberrations at the telephoto end in the third embodiment;

FIGS. 14A to 14E are graphs showing various aberrations at the wide-angle end in the fourth embodiment;

FIGS. 15A to 15E are graphs showing various aberrations in a middle focal length state in the fourth embodiment;

FIGS. 16A to 16E are graphs showing various aberrations at the telephoto end in the fourth embodiment;

FIGS. 18A to 18E are graphs showing various aberrations at the wide-angle end in the fifth embodiment;

FIGS. 19A to 19E are graphs showing various aberrations in a middle focal length state in the fifth embodiment;

FIGS. 20A to 20E are graphs showing various aberrations at the telephoto end in the fifth embodiment;

FIGS. 22A to 22E are graphs showing various aberrations at the wide-angle end in the sixth embodiment;

FIGS. 23A to 23E are graphs showing various aberrations in a middle focal length state in the sixth embodiment; and FIGS. 24A to 24E are graphs showing various aberrations at the telephoto end in the sixth embodiment.

DETAILED DESCRIPTION OF THE PREFERRED EMBODIMENTS

A zoom lens according to each of the embodiments of the present invention comprises, in the following order from the object side, a first lens unit G1 having a negative refractive power as a whole, and a second lens unit G2 having a positive refractive power as a whole, and effects zooming by changing the air gap between the first and second lens units G1 and G2. The first lens unit G1 comprises, in the following order from the object side, a first negative meniscus lens L1 with a concave surface having a more intense curvature and facing the image side, a second negative meniscus lens L2 with a concave surface having a more intense curvature and facing the image side, and a positive lens L3 with a convex surface facing the object side. The second lens unit G2 comprises, in the following order from the object side, a positive lens component L4 having at least two positive lenses, a negative lens component L5, and a positive lens component L6.

In each of the embodiments, in order to effectively shield off-axis marginal rays which generate a large upper coma, a flare stopper S2 is arranged behind (at the image side) the second lens unit G2. The flare stopper S2 moves along the optical axis independently of the second lens unit G2 during zooming, thereby effectively shielding an upper coma flare.

In each of the embodiments, an aperture stop A is arranged between the positive lens component L4 and the negative lens component L5.

First Embodiment

Figures 1A, 1B, 1C:
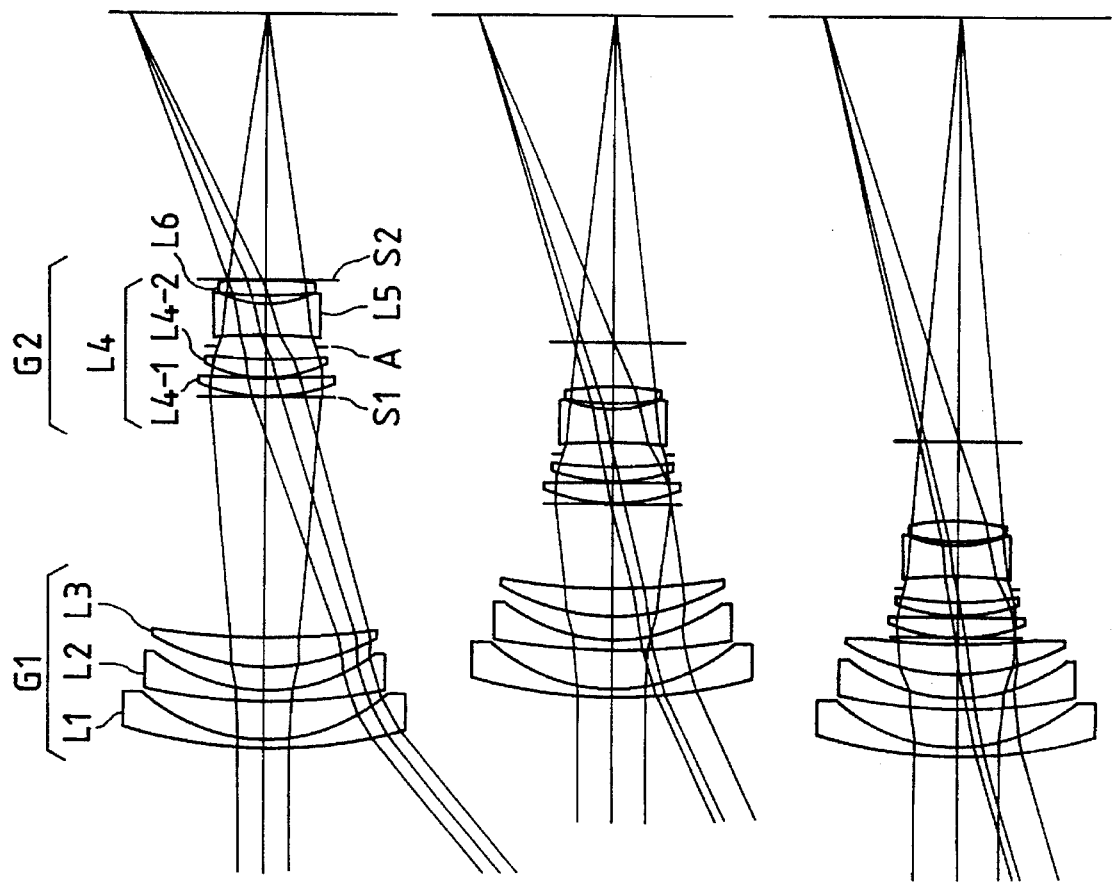
FIGS. 1A to 1C are views showing the lens arrangement of a zoom lens according to a first embodiment of the present invention, and the positions of the respective lens units at different zoom positions.

FIGS. 1A to 1C show the lens arrangement of a zoom lens according to the first embodiment of the present invention, and the positions of the respective lens units at different zoom positions. Specifically, FIG. 1A shows the arrangement at the wide-angle end, FIG. 1B shows the arrangement in a middle focal length state, and FIG. 1C shows the arrangement at the telephoto end.

The zoom lens shown in FIGS. 1A to 1C comprises, in the following order from the object side, a first lens unit G1 consisting of a first negative meniscus lens L1 with a concave surface facing the image side, a second negative meniscus lens L2 with a concave surface facing the image side, and a positive meniscus lens L3 with a convex surface facing the object side, and a second lens unit G2 consisting of a positive lens component L4 having two positive meniscus lenses L4-1 and L4-2 with convex surfaces facing the object side, a biconcave lens L5, and a biconvex lens L6.

A stationary stop S1 is arranged immediately next to the second lens unit G2 on its object side to effectively shield any lower coma flare.

Note that the second negative meniscus lens L2 in the first lens unit G1 is a compound aspherical lens consisting of a resin material and a glass material, and an aspherical surface is formed at the object side of this lens.

Table 1 below summarizes the data values of the first embodiment of the present invention. In Table 1, f is the focal length, FNO is the f-number, and 2ω is the field angle. Furthermore, the surface number represents the order of lens surfaces from the object side, and the refractive index and Abbe's number correspond to values for the d-line (λ=587.6 nm).

The aspherical surface is expressed by the following equation (c):

$$S(y) = (y^2/R)/[1 + (1 - k \cdot y^2/R^2)^{1/2}] + \\ C_2 \cdot y^2 + C_4 \cdot y^4 + C_6 \cdot y^6 + C_8 \cdot y^8 + \\ C_{10} \cdot y^{10} + \ldots \quad (c)$$

where y is the height in a direction perpendicular to the optical axis, S(y) is the displacement in the optical axis direction at the height y, R is the reference radius of curvature, k is a coefficient of cone, and Cn is an n-th order aspherical surface coefficient.

The paraxial radius r of curvature of the aspherical surface is defined by the following equation (d):

$$r = 1/(2 \cdot C_2 + 1/R) \quad (d)$$

Aspherical surfaces in the tables of the respective embodiments are indicated by attaching marks * to their surface numbers.

TABLE 1 f = 28.8 to 77.6
FNO = 3.6 to 5.8
2ω = 76.4 to 31.0°

| Surface Number | Radius of Curvature | Surface Interval | Abbe's Number | Refractive Index |
|---|---|---|---|---|
| 1 | 67.026 | 1.70 | 43.4 | 1.84042 |
| 2 | 26.946 | 6.30 | | |
| *3 | 130.650 | 0.03 | 56.3 | 1.49521 |
| 4 | 84.012 | 1.70 | 43.4 | 1.84042 |
| 5 | 25.229 | 4.10 | | |
| 6 | 31.442 | 5.20 | 28.6 | 1.79504 |
| 7 | 140.238 | (d7 = variable) | | |
| 8 | ∞ | −0.30 | (Stationary Stop S1) | |
| 9 | 24.004 | 3.60 | 65.4 | 1.60300 |
| 10 | 546.997 | 0.10 | | |
| 11 | 23.642 | 2.80 | 65.4 | 1.60300 |
| 12 | 88.546 | 4.15 | | |
| 13 | −71.590 | 5.00 | 28.6 | 1.79504 |
| 14 | 16.983 | 1.00 | | |
| 15 | 36.394 | 3.15 | 35.7 | 1.62588 |
| 16 | −36.394 | (d16 = variable) | | |
| 17 | ∞ | (d17 = variable) | (Flare Stopper S2) | |

(Variable Interval Upon Zooming)

| f | 28.8000 | 50.0000 | 77.6000 |
|---|---|---|---|
| d7 | 39.7573 | 13.7367 | 1.1644 |
| d16 | −0.2000 | 7.0000 | 13.0000 |
| d17 | 43.7424 | 53.5143 | 69.6096 |

(Aspherical Surface Data)
Third Surface

| k | $C_2$ | $C_4$ |
|---|---|---|
| −32.0000 | 0.0000 | $0.62557 \times 10^{-5}$ |
| $C_6$ | $C_8$ | $C_{10}$ |
| $0.12345 \times 10^{-8}$ | $0.57851 \times 10^{-11}$ | $0.75682 \times 10^{-14}$ |

Aspherical lens effective diameter φ = 35.53

(Condition Corresponding Values)

(1) $|f1|/(fw \cdot ft)^{1/2}$ = 0.994
(2) d45/d2 = 0.21
(3) (n1 + n2)/2 = 1.84
(4) d4/d2 = 0.328
(5) X2/fw = 1.357
(6) (vd1 + vd2)/2 = 43.4
(7) n4 = 1.603
(8) vd4 = 65.4
(9) f2/fw = 1.306
(10) d23/fw = 0.142
(11) |AS − S|/|fAS| = 0.015

FIGS. 2A to 2E, FIGS. 3A to 3E, and FIGS. 4A to 4E are graphs showing various aberrations in the first embodiment. FIGS. 2A to 2E are graphs showing various aberrations at the wide-angle end, FIGS. 3A to 3E are graphs showing various aberrations in a middle focal length state, and FIGS. 4A to 4E are graphs showing various aberrations at the telephoto end.

In these graphs, FNO is the f-number, Y is the image height, D is the d-line (λ=587.6 nm), and G is the g-line (λ=435.8 nm). In each graph showing an astigmatism, a solid curve represents the sagittal image plane, and a broken curve represents the meridional image plane. Furthermore, in each graph showing a spherical aberration, a broken curve represents the sine condition.

As can be seen from these graphs, in this embodiment, various aberrations are satisfactorily corrected in the respective focal length states.

Second Embodiment

Figures 5A, 5B, 5C:
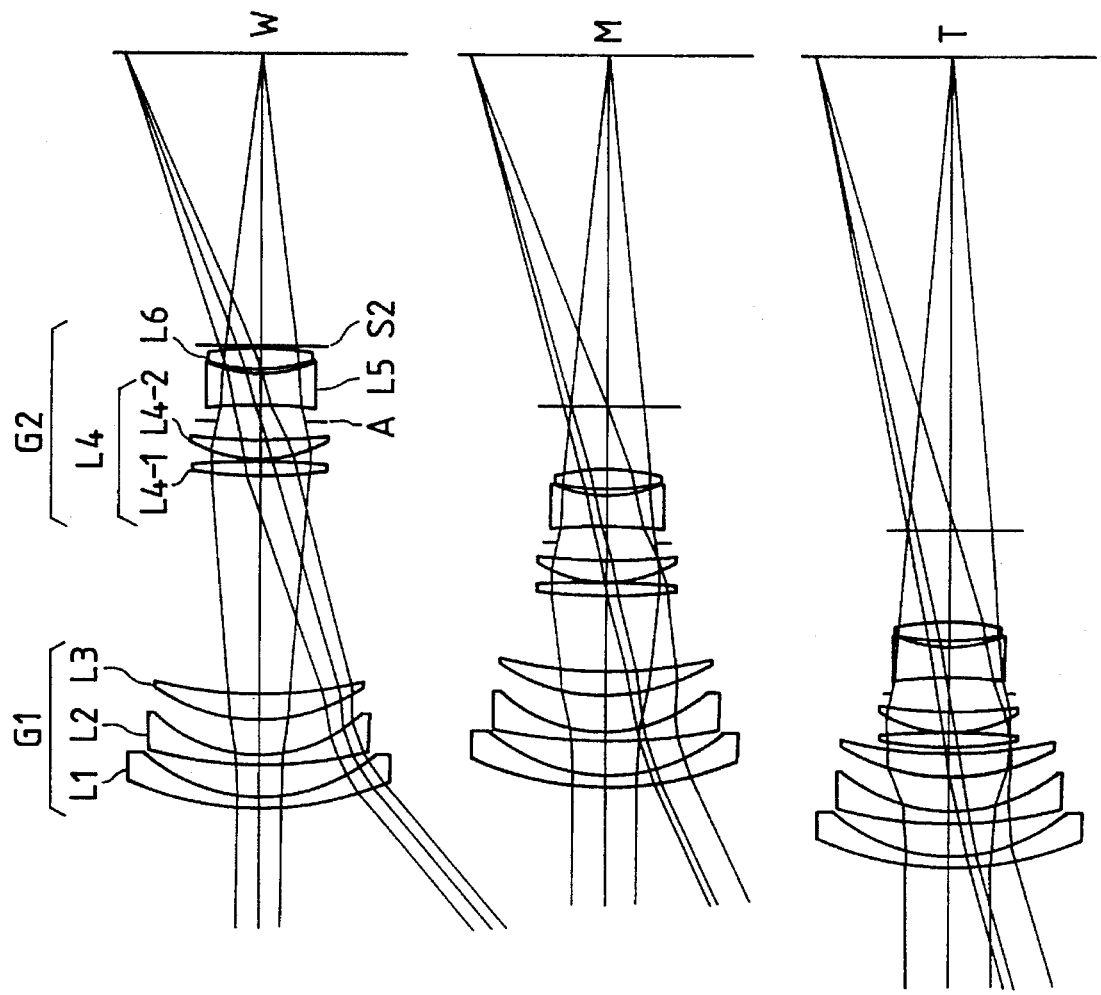
FIGS. 5A to 5C are views showing the lens arrangement of a zoom lens according to a second embodiment of the present invention, and the positions of the respective lens units at different zoom positions.

FIGS. 5A to 5C show the lens arrangement of a zoom lens according to the second embodiment of the present invention, and the positions of the respective lens units at different zoom positions. Specifically, FIG. 5A shows the arrangement at the wide-angle end, FIG. 5B shows the arrangement in a middle focal length state, and FIG. 5C shows the arrangement at the telephoto end.

The zoom lens shown in FIGS. 5A to 5C comprises, in the following order from the object side, a first lens unit G1 consisting of a first negative meniscus lens L1 with a concave surface facing the image side, a second negative meniscus lens L2 with a concave surface facing the image side, and a positive meniscus lens L3 with a convex surface facing the object side, and a second lens unit G2 consisting of a positive lens component L4 having a biconvex lens L4-1 and a positive meniscus lens L4-2 with a convex surface facing the object side, a biconcave lens L5, and a biconvex lens L6.

Unlike the first embodiment, no stationary stop S1 is arranged immediately next to the second lens unit G2 on its object side.

The second negative meniscus lens L2 in the first lens unit G1 is a compound aspherical lens consisting of a resin material and a glass material, and an aspherical surface is formed at the object side of this lens, as in the first embodiment.

Table 2 below summarizes the data values of the second embodiment of the present invention. In Table 2, f is the focal length, FNO is the f-number, and 2ω is the field angle. Furthermore, the surface number represents the order of lens surfaces from the object side, and the refractive index and Abbe's number correspond to values for the d-line (λ=587.6 nm).

TABLE 2 f = 28.8 to 77.6
FNO = 4.1 to 5.9
2ω = 76.7 to 31.1°

| Surface Number | Radius of Curvature | Surface Interval | Abbe's Number | Refractive Index |
|---|---|---|---|---|
| 1 | 49.116 | 1.70 | 43.4 | 1.84042 |
| 2 | 25.269 | 6.00 | | |
| *3 | 103.853 | 0.03 | 56.3 | 1.49521 |
| 4 | 73.000 | 1.70 | 43.4 | 1.84042 |
| 5 | 23.539 | 6.35 | | |
| 6 | 30.899 | 4.00 | 26.1 | 1.78470 |
| 7 | 75.600 | (d7 = variable) | | |
| 8 | 65.073 | 2.50 | 56.1 | 1.56883 |
| 9 | −154.543 | 0.10 | | |
| 10 | 21.001 | 3.50 | 58.5 | 1.65160 |
| 11 | 103.536 | 5.70 | | |
| 12 | −67.480 | 5.00 | 25.5 | 1.80458 |
| 13 | 19.775 | 1.00 | | |
| 14 | 38.998 | 3.50 | 35.7 | 1.62588 |
| 15 | −29.855 | (d15 = variable) | | |
| 16 | ∞ | (d16 = variable) | (Flare Stopper S2) | |

(Variable Interval Upon Zooming)

| f | 28.8000 | 50.0000 | 77.6000 |
|---|---|---|---|
| d7 | 35.8715 | 12.2288 | 0.8053 |
| d15 | −0.0802 | 9.9199 | 14.9199 |
| d16 | 47.8966 | 57.1971 | 77.3241 |

(Aspherical Surface Data)
Third Surface

| k | $C_2$ | $C_4$ |
|---|---|---|
| −9.3000 | 0.0000 | $0.63775 \times 10^{-5}$ |
| $C_6$ | $C_8$ | $C_{10}$ |
| $0.40743 \times 10^{-9}$ | $0.12946 \times 10^{-10}$ | $-0.25797 \times 10^{-14}$ |

Aspherical lens effective diameter φ = 33.46

(Condition Corresponding Values)

(1) $|f1|/(fw \cdot ft)^{1/2}$ = 0.888
(2) d45/d2 = 0.268

TABLE 2-continued (3) $(n1 + n2)/2 = 1.840$
(4) $d4/d2 = 0.286$
(5) $X2/fw = 1.54$
(6) $(vd1 + vd2)/2 = 43.4$
(7) $n4 = 1.611$
(8) $vd4 = 57.3$
(9) $f2/fw = 1.328$
(10) $d23/fw = 0.22$
(11) $|AS - S|/|fAS| = 0.013$ FIGS. 6A to 6E, FIGS. 7A to 7E, and FIGS. 8A to 8E are graphs showing various aberrations in the second embodiment. FIGS. 6A to 6E are graphs showing various aberrations at the wide-angle end, FIGS. 7A to 7E are graphs showing various aberrations in a middle focal length state, and FIGS. 8A to 8E are graphs showing various aberrations at the telephoto end.

In these graphs, FNO is the f-number, Y is the image height, D is the d-line ($\lambda$=587.6 nm), and G is the g-line ($\lambda$=435.8 nm). In each graph showing an astigmatism, a solid curve represents the sagittal image plane, and a broken curve represents the meridional image plane. Furthermore, in each graph showing a spherical aberration, a broken curve represents the sine condition.

As can be seen from these graphs, in this embodiment, various aberrations are satisfactorily corrected in the respective focal length states.

Third Embodiment

Figures 9A, 9B, 9C:
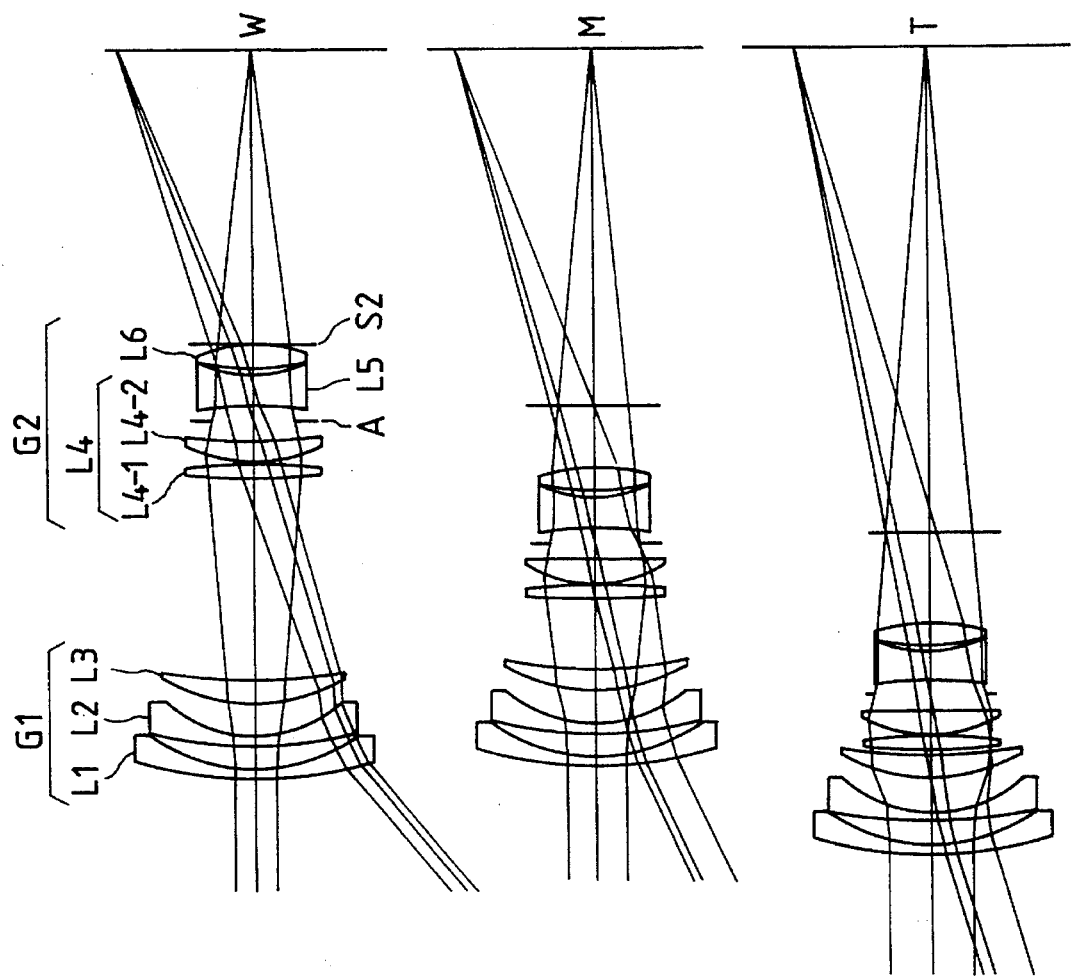
FIGS. 9A to 9C are views showing the lens arrangement of a zoom lens according to a third embodiment of the present invention, and the positions of the respective lens units at different zoom positions.

FIGS. 9A to 9C show the lens arrangement of a zoom lens according to the third embodiment of the present invention, and the positions of the respective lens units at different zoom positions. Specifically, FIG. 9A shows the arrangement at the wide-angle end, FIG. 9B shows the arrangement in a middle focal length state, and FIG. 9C shows the arrangement at the telephoto end.

The zoom lens shown in FIGS. 9A to 9C comprises, in the following order from the object side, a first lens unit G1 consisting of a first negative meniscus lens L1 with a concave surface facing the image side, a second negative meniscus lens L2 with a concave surface facing the image side, and a positive meniscus lens L3 with a convex surface facing the object side, and a second lens unit G2 consisting of a positive lens component L4 having a biconvex lens L4-1 and a positive meniscus lens L4-2 with a convex surface facing the object side, a biconcave lens L5, and a biconvex lens L6.

Unlike the first embodiment, no stationary stop S1 is arranged immediately next to the second lens unit G2 on its object side.

Also, unlike the first embodiment, the first negative meniscus lens L1 in the first lens unit G1 is an aspherical lens consisting of only a glass material, and an aspherical surface is formed at its image side.

Table 3 below summarizes the data values of the third embodiment of the present invention. In Table 3, f is the focal length, FNO is the f-number, and 2ω is the field angle. Furthermore, the surface number represents the order of lens surfaces from the object side, and the refractive index and Abbe's number correspond to values for the d-line ($\lambda$=587.6 nm).

TABLE 3

$f = 28.8$ to $77.6$
$FNO = 4.2$ to $5.8$
$2\omega = 76.6$ to $31.2°$

| Surface Number | Radius of Curvature | Surface Interval | Abbe's Number | Refractive Index |
|---|---|---|---|---|
| 1 | 62.150 | 1.70 | 46.5 | 1.80411 |
| *2 | 25.427 | 4.00 | | |
| 3 | 69.090 | 1.70 | 39.8 | 1.86994 |
| 4 | 21.532 | 5.88 | | |
| 5 | 29.439 | 3.70 | 25.5 | 1.80458 |
| 6 | 79.654 | (d6 = variable) | | |
| 7 | 102.179 | 2.50 | 54.6 | 1.51454 |
| 8 | −92.066 | 0.10 | | |
| 9 | 21.269 | 4.00 | 58.5 | 1.65160 |
| 10 | 203.932 | 5.70 | | |
| 11 | −42.892 | 5.00 | 25.5 | 1.80458 |
| 12 | 21.795 | 1.00 | | |
| 13 | 45.486 | 4.00 | 35.7 | 1.62588 |
| 14 | −24.299 | (d14 = variable) | | |
| 15 | ∞ | (d15 = variable) | (Flare Stopper S2) | |

(Variable Interval Upon Zooming)

| f | 28.8000 | 50.0000 | 77.6000 |
|---|---|---|---|
| d6 | 34.3389 | 11.8219 | 0.9423 |
| d14 | 0.0000 | 10.0000 | 15.0000 |
| d15 | 49.4333 | 59.6988 | 81.0821 |

(Aspherical Surface Data)
Second Surface

| k | $C_2$ | $C_4$ |
|---|---|---|
| 0.5730 | 0.0000 | $-0.12737 \times 10^{-5}$ |
| $C_6$ | $C_8$ | $C_{10}$ |
| $-0.44756 \times 10^{-8}$ | $-0.68479 \times 10^{-11}$ | $-0.13969 \times 10^{-13}$ |

Aspherical lens effective diameter $\phi = 32.03$ (Condition Corresponding Values)

(1) $|f1|/(fw \cdot ft)^{1/2} = 0.846$
(2) $d45/d2 = 0.256$
(3) $(n1 + n2)/2 = 1.837$
(4) $d4/d2 = 0.296$
(5) $X2/fw = 1.620$
(6) $(vd1 + vd2)/2 = 43.2$
(7) $n4 = 1.583$
(8) $vd4 = 56.5$
(9) $f2/fw = 1.328$
(10) $d23/fw = 0.204$
(11) $|AS - S|/|fAS| = 0.0094$ FIGS. 10A to 10E, FIGS. 11A to 11E, and FIGS. 12A to 12E are graphs showing various aberrations in the third embodiment. FIGS. 10A to 10E are graphs showing various aberrations at the wide-angle end, FIGS. 11A to 11E are graphs showing various aberrations in a middle focal length state, and FIGS. 12A to 12E are graphs showing various aberrations at the telephoto end.

In these graphs, FNO is the f-number, Y is the image height, D is the d-line ($\lambda$=587.6 nm), and G is the g-line ($\lambda$=435.8 nm). In each graph showing an astigmatism, a solid curve represents the sagittal image plane, and a broken curve represents the meridional image plane. Furthermore, in each graph showing a spherical aberration, a broken curve represents the sine condition.

As can be seen from these graphs, in this embodiment, various aberrations are satisfactorily corrected in the respective focal length states.

Fourth Embodiment

Figures 13A, 13B, 13C:
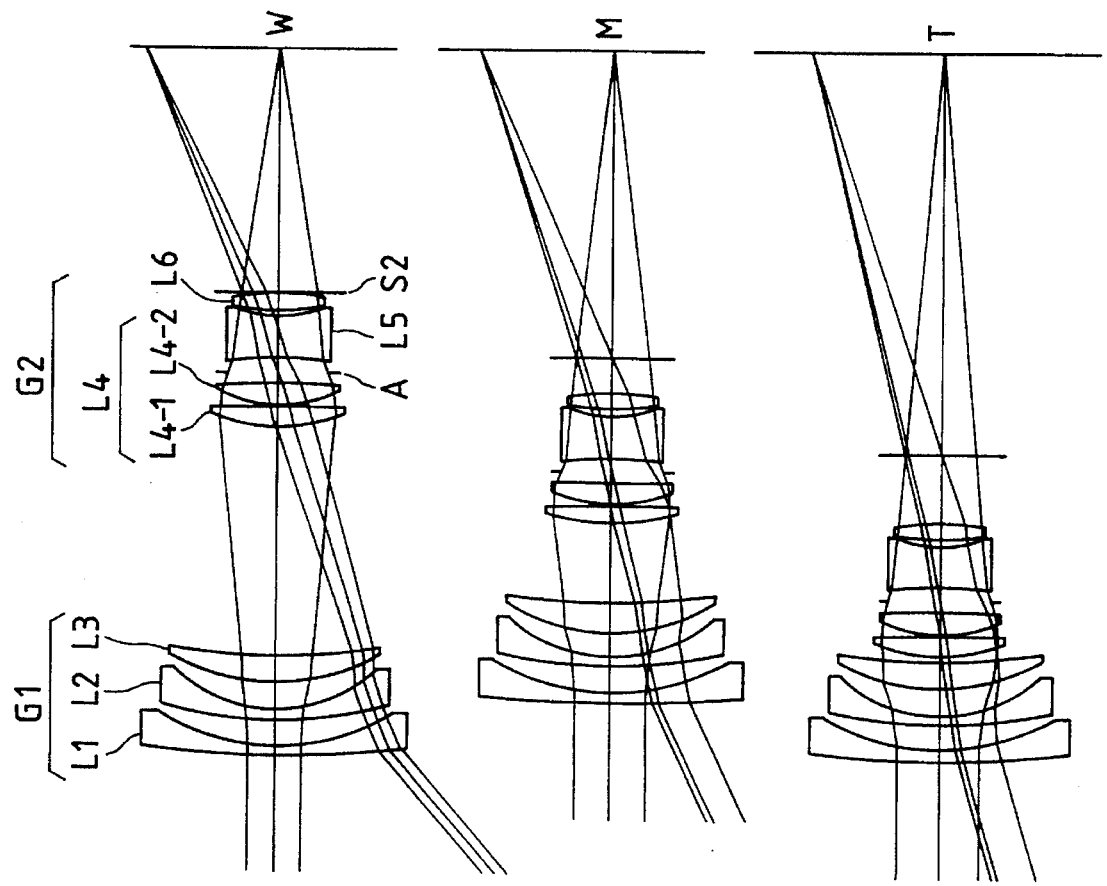
FIGS. 13A to 13C are views showing the lens arrangement of a zoom lens according to a fourth embodiment of the present invention, and the positions of the respective lens units at different zoom positions.

FIGS. 13A to 13C show the lens arrangement of a zoom lens according to the fourth embodiment of the present invention, and the positions of the respective lens units at different zoom positions. Specifically, FIG. 13A shows the arrangement at the wide-angle end, FIG. 13B shows the arrangement in a middle focal length state, and FIG. 13C shows the arrangement at the telephoto end.

The zoom lens shown in FIGS. 13A to 13C comprises, in the following order from the object side, a first lens unit G1 consisting of a first negative meniscus lens L1 with a concave surface facing the image side, a second negative meniscus lens L2 with a concave surface facing the image side, and a positive meniscus lens L3 with a convex surface facing the object side, and a second lens unit G2 consisting of a positive lens component L4 having a biconvex lens L4-1 and a positive meniscus lens L4-2 with a convex surface facing the object side, a biconcave lens LS, and a biconvex lens L6.

Unlike the first embodiment, no stationary stop S1 is arranged immediately next to the second lens unit G2 on its object side.

Also, unlike the first embodiment, the first negative meniscus lens L1 in the first lens unit G1 is a compound aspherical lens consisting of a resin material and a glass material, and an aspherical surface is formed at its image side.

Table 4 below summarizes the data values of the fourth embodiment of the present invention. In Table 4, f is the focal length, FNO is the f-number, and is the field angle. Furthermore, the surface number represents the order of lens surfaces from the object side, and the refractive index and Abbe's number correspond to values for the d-line ($\lambda$=587.6 nm).

TABLE 4 f = 28.8 to 77.6
FNO = 3.45 to 5.8
2ω = 76.6 to 30.8°

| Surface Number | Radius of Curvature | Surface Interval | Abbe's Number | Refractive Index |
|---|---|---|---|---|
| 1 | 208.057 | 1.80 | 40.9 | 1.79631 |
| 2 | 34.000 | 0.03 | 56.3 | 1.49521 |
| *3 | 28.314 | 4.50 | | |
| 4 | 72.273 | 1.80 | 45.4 | 1.79668 |
| 5 | 23.479 | 4.30 | | |
| 6 | 31.356 | 5.10 | 28.6 | 1.79504 |
| 7 | 161.301 | (d7 = variable) | | |
| 8 | 29.445 | 3.50 | 64.1 | 1.51680 |
| 9 | −309.150 | 0.10 | | |
| 10 | 19.790 | 4.00 | 70.4 | 1.48749 |
| 11 | −432.278 | 4.30 | | |
| 12 | −54.895 | 6.85 | 28.6 | 1.79504 |
| 13 | 16.970 | 1.30 | | |
| 14 | 35.019 | 3.00 | 35.7 | 1.62588 |
| 15 | −38.331 | (d15 = variable) | | |
| 16 | ∞ | (d16 = variable) | | (Flare Stopper S2) |

(Variable Interval Upon Zooming)

| f | 28.7985 | 50.0000 | 77.5987 |
|---|---|---|---|
| d7 | 39.3926 | 13.3639 | 0.7884 |
| d15 | 0.0000 | 6.0000 | 12.0000 |
| d16 | 40.9879 | 51.9548 | 68.0428 |

(Aspherical Surface Data)
Third Surface

| k | $C_2$ | $C_4$ |
|---|---|---|
| 0.6000 | 0.0000 | −0.60429 × 10⁻⁵ |
| $C_6$ | $C_8$ | $C_{10}$ |
| 0.35851 × 10⁻⁹ | −0.34196 × 10⁻¹⁰ | 0.26830 × 10⁻¹³ |

Aspherical lens effective diameter $\phi$ = 35.74
(Condition Corresponding Values)

(1) $|f1|/(fw \cdot ft)^{1/2} = 0.994$
(2) d45/d2 = 0.187

TABLE 4-continued (3) (n1 + n2)/2 = 1.796
(4) d4/d2 = 0.330
(5) X2/fw = 1.356
(6) (vd1 + vd2)/2 = 43.1
(7) n4 = 1.502
(8) vd4 = 67.3
(9) f2/fw = 1.306
(10) d23/fw = 0.149
(11) |AS − SI/|fAS| = 0.0270

FIGS. 14A to 14E, FIGS. 15A to 15E, and FIGS. 16A to 16E are graphs showing various aberrations in the fourth embodiment. FIGS. 14A to 14E are graphs showing various aberrations at the wide-angle end, FIGS. 15A to 15E are graphs showing various aberrations in a middle focal length state, and FIGS. 16A to 16E are graphs showing various aberrations at the telephoto end.

In these graphs, FNO is the f-number, Y is the image height, D is the d-line ($\lambda$=587.6 nm), and G is the g-line ($\lambda$=435.8 nm). In each graph showing an astigmatism, a solid curve represents the sagittal image plane, and a broken curve represents the meridional image plane. Furthermore, in each graph showing a spherical aberration, a broken curve represents the sine condition.

As can be seen from these graphs, in this embodiment, various aberrations are satisfactorily corrected in the respective focal length states.

Fifth Embodiment

Figures 17A, 17B, 17C:
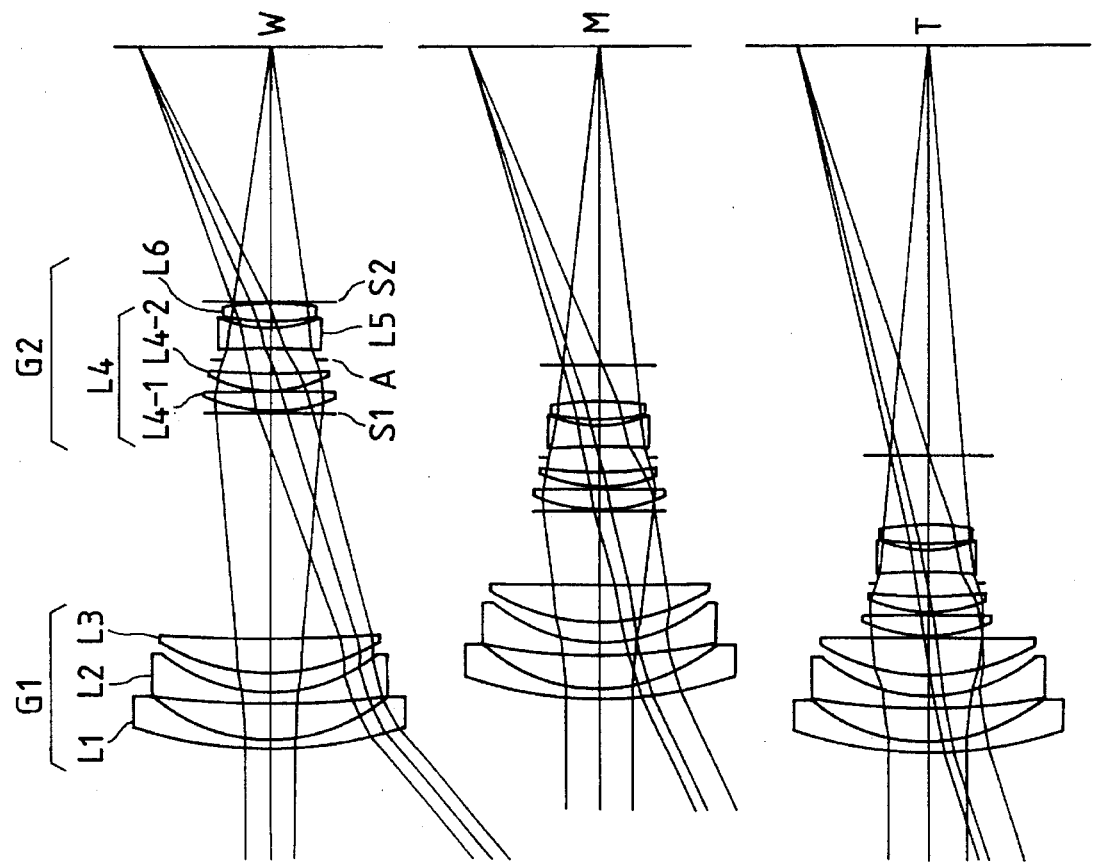
FIGS. 17A to 17C are views showing the lens arrangement of a zoom lens according to a fifth embodiment of the present invention, and the positions of the respective lens units at different zoom positions.

FIGS. 17A to 17C show the lens arrangement of a zoom lens according to the fifth embodiment of the present invention, and the positions of the respective lens units at different zoom positions. Specifically, FIG. 17A shows the arrangement at the wide-angle end, FIG. 17B shows the arrangement in a middle focal length state, and FIG. 17C shows the arrangement at the telephoto end.

The zoom lens shown in FIGS. 17A to 17C comprises, in the following order from the object side, a first lens unit G1 consisting of a first negative meniscus lens L1 with a concave surface facing the image side, a second negative meniscus lens L2 with a concave surface facing the image side, and a positive meniscus lens L3 with a convex surface facing the object side, and a second lens unit G2 consisting of a positive lens component L4 having a biconvex lens L4-1 and a positive meniscus lens L4-2 with a convex surface facing the object side, a biconcave lens L5, and a biconvex lens L6.

A stationary stop S1 is arranged immediately next to the second lens unit G2 on its object side to effectively shield a lower coma flare as in the first embodiment.

Also, the second negative meniscus lens L2 in the first lens unit G1 is a compound aspherical lens consisting of a resin material and a glass material, and an aspherical surface is formed at its object side, as in the first embodiment.

Table 5 below summarizes the data values of the fifth embodiment of the present invention. In Table 5, f is the focal length, FNO is the f-number, and 2ω is the field angle. Furthermore, the surface number represents the order of lens surfaces from the object side, and the refractive index and Abbe's number correspond to values for the d-line ($\lambda$=587.6 nm).

TABLE 5 f = 28.8 to 77.6
FNO = 3.59 to 5.8
2ω = 76.6 to 31.0°

| Surface Number | Radius of Curvature | Surface Interval | Abbe's Number | Refractive Index |
| --- | --- | --- | --- | --- |
| 1 | 67.509 | 1.70 | 41.0 | 1.88067 |
| 2 | 28.702 | 6.00 | | |
| *3 | 245.240 | 0.03 | 56.3 | 1.49521 |
| 4 | 110.000 | 1.70 | 41.0 | 1.88067 |
| 5 | 24.601 | 3.49 | | |
| 6 | 30.959 | 6.50 | 28.4 | 1.79504 |
| 7 | 311.579 | (d7 = variable) | | |
| 8 | ∞ | 0.00 | (Stationary Stop S1) | |
| 9 | 24.499 | 3.75 | 70.5 | 1.48749 |
| 10 | −371.259 | 0.10 | | |
| 11 | 20.260 | 3.00 | 63.5 | 1.62014 |
| 12 | 73.132 | 4.50 | | |
| 13 | −88.888 | 3.40 | 28.4 | 1.79504 |
| 14 | 16.449 | 1.20 | | |
| 15 | 42.655 | 3.50 | 35.8 | 1.66446 |
| 16 | −39.623 | (d16 = variable) | | |
| 17 | ∞ | (d17 = variable) | (Flare Stopper S2) | |

(Variable Interval Upon Zooming)

| f | 28.8000 | 50.0000 | 77.6000 |
| --- | --- | --- | --- |
| d7 | 39.2667 | 13.2412 | 0.6663 |
| d16 | 0.0000 | 6.0000 | 12.0000 |
| d17 | 43.5461 | 54.5125 | 70.6010 |

(Aspherical Surface Data)
Third Surface

| k | $C_2$ | $C_4$ |
| --- | --- | --- |
| 27.7661 | 0.0000 | $0.49450 \times 10^{-5}$ |
| $C_6$ | $C_8$ | $C_{10}$ |
| $-0.20258 \times 10^{-8}$ | $0.24886 \times 10^{-10}$ | $-0.17838 \times 10^{-13}$ |

Aspherical lens effective diameter φ = 36.59

(Condition Corresponding Values)

(1) $|f1|/(fw \cdot ft)^{1/2} = 0.994$
(2) $d45/d2 = 0.231$
(3) $(n1 + n2)/2 = 1.881$
(4) $d4/d2 = 0.352$
(5) $X2/fw = 1.356$
(6) $(vd1 + vd2)/2 = 41.0$
(7) $n4 = 1.554$
(8) $vd4 = 67.0$
(9) $f2/fw = 1.306$
(10) $d23/fw = 0.121$
(11) $|AS - S|/|fAS| = 0.0224$ FIGS. 18A to 18E, FIGS. 19A to 19E, and FIGS. 20A to 20E are graphs showing various aberrations in the fifth embodiment. FIGS. 18A to 18E are graphs showing various aberrations at the wide-angle end, FIGS. 19A to 19E are graphs showing various aberrations in a middle focal length state, and FIGS. 20A to 20E are graphs showing various aberrations at the telephoto end.

In these graphs, FNO is the f-number, Y is the image height, D is the d-line (λ=587.6 nm), and G is the g-line (λ=435.8 nm). In each graph showing an astigmatism, a solid curve represents the sagittal image plane, and a broken curve represents the meridional image plane. Furthermore, in each graph showing a spherical aberration, a broken curve represents the sine condition.

As can be seen from these graphs, in this embodiment, various aberrations are satisfactorily corrected in the respective focal length states.

Sixth Embodiment

Figures 21A, 21B, 21C:
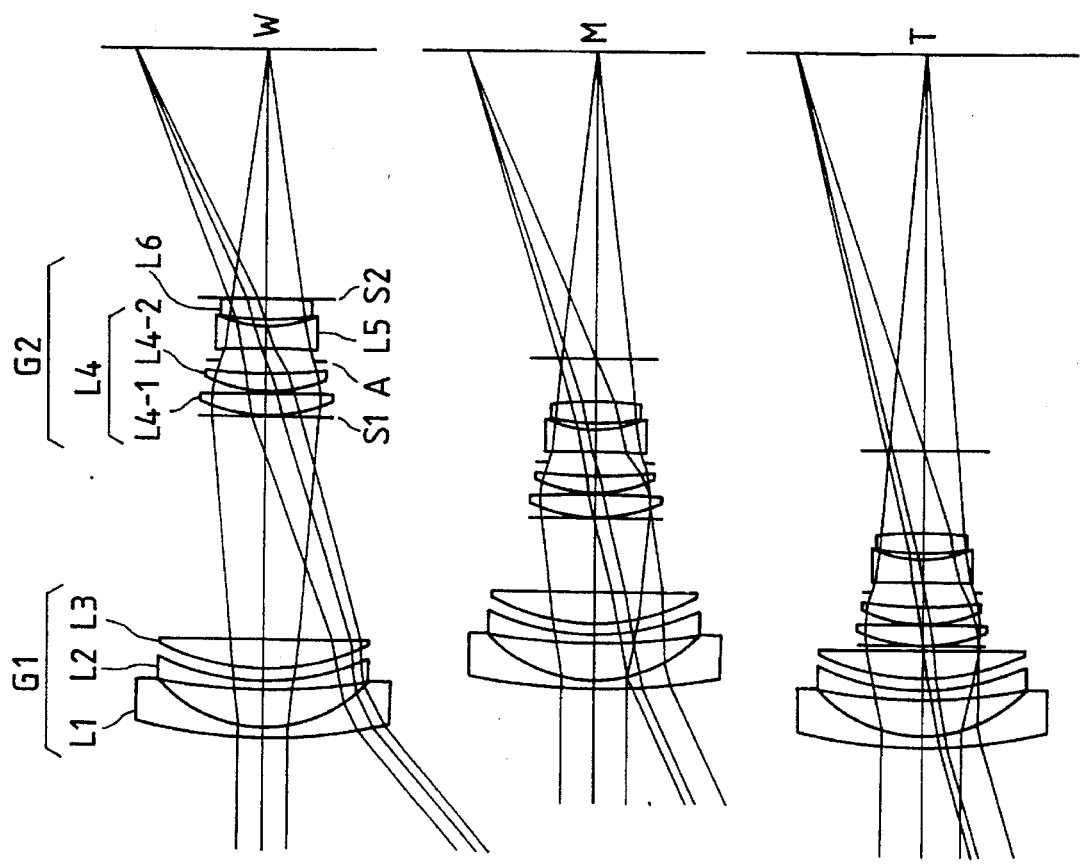
FIGS. 21A to 21C are views showing the lens arrangement of a zoom lens according to a sixth embodiment of the present invention, and the positions of the respective lens units at different zoom positions.

FIGS. 21A to 21C show the lens arrangement of a zoom lens according to the sixth embodiment of the present invention, and the positions of the respective lens units at different zoom positions. Specifically, FIG. 21A shows the arrangement at the wide-angle end, FIG. 21B shows the arrangement in a middle focal length state, and FIG. 21C shows the arrangement at the telephoto end.

The zoom lens shown in FIGS. 21A to 21C comprises, in the following order from the object side, a first lens unit G1 consisting of a first negative meniscus lens L1 with a concave surface facing the image side, a second negative meniscus lens L2 with a concave surface facing the image side, and a positive meniscus lens L3 with a convex surface facing the object side, and a second lens unit G2 consisting of a positive lens component L4 having a biconvex lens L4-1 and a positive meniscus lens L4-2 with a convex surface facing the object side, a biconcave lens L5, and a biconvex lens L6.

A stationary stop S1 is arranged immediately next to the second lens unit G2 on its object side to effectively shield a lower coma flare as in the first embodiment.

Also, the second negative meniscus lens L2 in the first lens unit G1 is a compound aspherical lens consisting of a resin material and a glass material, and an aspherical surface is formed at its object side, as in the first embodiment.

Table 6 below summarizes the data values of the sixth embodiment of the present invention. In Table 6, f is the focal length, FNO is the f-number, and 2ω is the field angle. Furthermore, the surface number represents the order of lens surfaces from the object side, and the refractive index and Abbe's number correspond to values for the d-line (λ=587.6 nm).

TABLE 6 f = 28.8 to 77.6
FNO = 3.6 to 5.8
2ω = 76.7 to 31.0°

| Surface Number | Radius of Curvature | Surface Interval | Abbe's Number | Refractive Index |
| --- | --- | --- | --- | --- |
| 1 | 88.290 | 1.70 | 41.0 | 1.88067 |
| 2 | 22.085 | 6.70 | | |
| *3 | 148.413 | 0.03 | 56.3 | 1.49521 |
| 4 | 82.000 | 1.70 | 41.0 | 1.88067 |
| 5 | 35.649 | 2.04 | | |
| 6 | 33.494 | 5.30 | 28.4 | 1.79504 |
| 7 | 427.378 | (d7 = variable) | | |
| 8 | ∞ | 0.00 | (Stationary Stop S1) | |
| 9 | 24.453 | 3.90 | 70.5 | 1.48749 |
| 10 | −484.479 | 0.10 | | |
| 11 | 19.112 | 3.00 | 63.5 | 1.62014 |
| 12 | 59.638 | 4.50 | | |
| 13 | −166.912 | 3.45 | 28.4 | 1.79504 |
| 14 | 14.959 | 1.20 | | |
| 15 | 32.079 | 4.00 | 35.8 | 1.66446 |
| 16 | −57.122 | (d16 = variable) | | |
| 17 | ∞ | (d17 = variable) | (Flare Stopper S2) | |

(Variable Interval Upon Zooming)

| f | 28.8000 | 50.0000 | 77.6000 |
| --- | --- | --- | --- |
| d7 | 39.3853 | 13.3594 | 0.7843 |
| d16 | 0.0000 | 7.0000 | 14.0000 |
| d17 | 42.6827 | 52.6485 | 67.7359 |

(Aspherical Surface Data)
Third Surface

| k | $C_2$ | $C_4$ |
| --- | --- | --- |
| −3.1713 | 0.0000 | $0.53206 \times 10^{-5}$ |
| $C_6$ | $C_8$ | $C_{10}$ |
| $0.69220 \times 10^{-8}$ | $-0.93251 \times 10^{-11}$ | $0.85710 \times 10^{-13}$ |

Aspherical lens effective diameter φ = 32.82

(Condition Corresponding Values)

(1) $|f1|/(fw \cdot ft)^{1/2} = 0.994$

TABLE 6-continued (2) d45/d2 = 0.223
(3) (n1 + n2)/2 = 1.880
(4) d4/d2 = 0.347
(5) X2/fw = 1.356
(6) (vd1 + vd2)/2 = 41.0
(7) n4 = 1.554
(8) vd4 = 67.0
(9) f2/fw = 1.306
(10) d23/fw = 0.0709
(11) |AS − SI/|fAS| = 0.0096

FIGS. 22A to 22E, FIGS. 23A to 23E, and FIGS. 24A to 24E are graphs showing various aberrations in the sixth embodiment. FIGS. 22A to 22E are graphs showing various aberrations at the wide-angle end, FIGS. 23A to 23E are graphs showing various aberrations in a middle focal length state, and FIGS. 24A to 24E are graphs showing various aberrations at the telephoto end.

In these graphs, FNO is the f-number, Y is the image height, D is the d-line ($\lambda$=587.6 nm), and G is the g-line ($\lambda$=435.8 nm). In each graph showing an astigmatism, a solid curve represents the sagittal image plane, and a broken curve represents the meridional image plane. Furthermore, in each graph showing a spherical aberration, a broken curve represents the sine condition.

As can be seen from these graphs, in this embodiment, various aberrations are satisfactorily corrected in the respective focal length states.

In each of the above embodiments, an aspherical surface is formed on one of the first and second negative meniscus lenses L1 and L2. Alternatively, aspherical surfaces may be formed on both the first and second negative meniscus lenses L1 and L2. Also, an aspherical surface may be formed on the positive lens L3 in the first lens unit G1 or the second lens unit G2.

In each of the above embodiments, the aperture stop A is arranged between the positive and negative lens components L4 and L5 in the second lens unit G2. Alternatively, the aperture stop A may be inserted between the first and second lens units G1 and G2, between the two positive lenses in the positive lens component L4, or the like.

In each of the above embodiments, the flare stopper S2 is arranged behind the second lens unit G2 to effectively shield the upper coma, and moves along a path different from that of the second lens unit G2. However, the flare stopper S2 may move along any other paths as long as the upper coma can be effectively shielded.

In each of the above embodiments, the aperture stop A is arranged between the positive lens L4-2 and the negative lens L5 in the second lens unit G2. Alternatively, the aperture stop A may be inserted between the first and second lens units G1 and G2, between the positive lenses L4-1 and L4-2, or the like.

Furthermore, even when a third lens unit having a weak refractive power is arranged according to the present invention, the same effect can be expected since such an arrangement includes that of the present invention in practice and is considered to be the same arrangement.

As described above, according to the present invention, a compact, low-cost standard zoom lens, which is constituted by a very small number of lenses, and has a zoom ratio of about 2.7, a field angle of about 74° at the wide-angle end, and good imaging performance, can be realized.

What is claimed is:

1. A zoom lens comprising, in the following order from an object side:

a first lens unit having a negative refracting power and at least one lens surface that is aspherical, said first lens unit comprising, in the following order from the object side, a first negative meniscus lens with a concave surface of greater curvature facing an image side, a second negative meniscus lens with a concave surface of greater curvature facing the image side, and a positive lens with a convex surface facing the object side; and a second lens unit having a positive refracting power, said second lens unit comprising, in the following order from the object side, a positive lens component having at least two positive lenses, a negative lens component, and a positive lens component, wherein said zoom lens satisfies the following conditions:

$$0.6<|f1|/(fw \cdot ft)^{1/2}<1.0 \text{ and}$$

$$0.3<d45/d2<0.5$$

where
f1: the focal length of said first lens unit
fw: the focal length of the entire zoom lens at the wide-angle end
ft: the focal length of the entire zoom lens at the telephoto end
d45: the on-axis air gap between said positive and negative lens components in said second lens unit
d2: the total on-axis thickness of said second lens unit.

2. A zoom lens according to claim 1, wherein said zoom lens satisfies the following condition:

$$1.786<(n1+n2)/2<2$$

where n1 is the refractive index for the d-line of said first negative meniscus lens in said first lens unit, and n2 is the refractive index for the d-line of said second negative meniscus lens.

3. A zoom lens according to claim 1, wherein said zoom lens satisfies the following condition:

$$0.2<d4/d2<0.5$$

where d4 is the total on-axis thickness of said positive lens component in said second lens unit.

4. A zoom lens according to claim 1, wherein said zoom lens satisfies the following condition:

$$1.2<X2/fw<2.5$$

where X2 is the moving amount of said second lens unit upon zooming.

5. A zoom lens according to claim 1, wherein at least one of lens surfaces of said first negative meniscus lens and said second negative meniscus lens in said first lens unit is an aspherical surface.

6. A zoom lens comprising, in the following order from an object side:

a first lens unit having a negative refracting power and at least one lens surface that is aspherical, said first lens unit comprising, in the following order from the object side, a first negative meniscus lens with a concave surface of greater curvature facing an image side, a second negative meniscus lens with a concave surface of greater curvature facing the image side, and a positive lens with a convex surface facing the object side; and a second lens unit having a positive refracting power, said second lens unit comprising, in the following order from the object side, a positive lens component having at least two positive lenses, a negative lens component, and a positive lens component, wherein said zoom lens satisfies the following conditions:

$0.6 < |f1|/(fw \cdot ft)^{1/2} < 1.0$ and $1.2 < X2/fw < 2.5$ where
- f1: the focal length of said first lens unit
- fw: the focal length of the entire zoom lens at the wide-angle end
- ft: the focal length of the entire zoom lens at the telephoto end
- X2: the moving amount of said second lens unit upon zooming.

7. A zoom lens according to claim 6, wherein said zoom lens satisfies the following condition:

$1.786 < (n1+n2)/2 < 2$ where n1 is the refractive index for the d-line of said first negative meniscus lens in said first lens unit, and n2 is the refractive index for the d-line of said second negative meniscus lens.

8. A zoom lens according to claim 6, wherein said zoom lens satisfies the following condition:

$0.2 < d4/d2 < 0.5$ where d2 is the total on-axis thickness of said second lens unit, and d4 is the total on-axis thickness of said positive lens component in said second lens unit.

9. A zoom lens according to claim 6, wherein at least one of lens surfaces of said first negative meniscus lens and said second negative meniscus lens in said first lens unit is an aspherical surface.

* * * * *